(12) United States Patent
Ohashi

(10) Patent No.: US 8,451,496 B2
(45) Date of Patent: May 28, 2013

(54) INFORMATION PROCESSING APPARATUS, PRINTING APPARATUS, PRINTING SYSTEM, INFORMATION PROCESSING APPARATUS CONTROL METHOD, PRINTING APPARATUS CONTROL METHOD, AND COMPUTER-READABLE STORAGE MEDIUM FOR DESIGNATING A PRINT SETTING FOR A PRINT JOB

(75) Inventor: Toshio Ohashi, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 374 days.

(21) Appl. No.: 12/850,153

(22) Filed: Aug. 4, 2010

(65) Prior Publication Data

US 2011/0032569 A1 Feb. 10, 2011

(30) Foreign Application Priority Data

Aug. 7, 2009 (JP) ................................ 2009-184182

(51) Int. Cl.
*G06F 15/00* (2006.01)
*G06F 3/12* (2006.01)
*G06K 1/00* (2006.01)

(52) U.S. Cl.
USPC ........................... 358/1.9; 358/1.15; 358/1.13

(58) Field of Classification Search
None
See application file for complete search history.

(56) References Cited

U.S. PATENT DOCUMENTS

| 6,962,449 | B2 * | 11/2005 | Lermant et al. ................. 400/76 |
| 2001/0012124 | A1 * | 8/2001 | Morikawa ...................... 358/296 |
| 2001/0024584 | A1 * | 9/2001 | Kurosawa ........................ 400/76 |
| 2002/0097432 | A1 | 7/2002 | Kumashio |
| 2002/0146256 | A1 * | 10/2002 | Sekiguchi et al. .............. 399/82 |
| 2004/0141203 | A1 * | 7/2004 | Honma ......................... 358/1.15 |
| 2006/0110177 | A1 * | 5/2006 | Ushio et al. ..................... 399/81 |
| 2006/0238781 | A1 * | 10/2006 | Fukao ............................ 358/1.9 |
| 2007/0115493 | A1 * | 5/2007 | Haginaka et al. ........... 358/1.14 |

FOREIGN PATENT DOCUMENTS

| JP | 2002-215353 A | 8/2002 |
| JP | 2006-236382 A | 9/2006 |

* cited by examiner

*Primary Examiner* — King Y. Poon
*Assistant Examiner* — Ming Hon
(74) *Attorney, Agent, or Firm* — Canon USA, Inc., IP Division

(57) ABSTRACT

In an information processing apparatus, in response to designation of a paper setting via a user interface of a printer driver, a print setting generation unit determines whether the designated paper setting corresponds to a paper type relating to back side paper based on paper type setting information acquired from a printer. Further, the print setting generation unit performs control to prevent a print setting designated as an inhibition rule in the print setting inhibition rule information from being designated by the user interface, if it is determined that the designated paper setting corresponds to the paper type relating to the back side paper and print setting inhibition rule information associated with the paper type corresponding to the designated paper setting is stored in a print setting inhibition rule management database.

19 Claims, 22 Drawing Sheets

FIG.9A

| SETTING OF PRINT SETTING INHIBITION RULE - PRINT SETTING | ☒ |
|---|---|

PRINT SETTING INHIBITION RULE:

| PAPER TYPE NAME | PRINT SETTING |
|---|---|
| BACK SIDE PAPER 1 | STAMP (CONFIDENTIAL) |
| BACK SIDE PAPER 1 | PAGE LAYOUT (2 PAGES/SHEET) |
| | |

~901

| ADDITION | DELETION | CANCEL | HELP |
|---|---|---|---|
| 902 | 903 | 904 | |

FIG.9B

| ADDITION OF PRINT SETTING INHIBITION RULE - SETTING OF PRINT SETTING INHIBITION RULE | | | | | ☒ |
|---|---|---|---|---|---|
| SELECTION OF PAPER TYPE: | | | | | |
| NAME | CLASS | GRAMMAGE | SHAPE | SURFACE PROPERTIES | |
| BACK SIDE PAPER 1 | PAPER SET BY USER | 77 g/m² | STANDARD | FINE QUALITY PAPER | |
| BACK SIDE PAPER 2 | PAPER SET BY USER | 77 g/m² | STANDARD | FINE QUALITY PAPER | ~905 |

| SELECTION OF PRINT SETTING: | | |
|---|---|---|
| CATEGORY | SETTING NAME | |
| PAGE SETTING | PAGE LAYOUT (1 PAGE/SHEET) | |
| PAGE SETTING | PAGE LAYOUT (2 PAGES/SHEET) | |
| PAGE SETTING | PAGE LAYOUT (4 PAGES/SHEET) | |
| PAGE SETTING | STAMP (SECRET) | ~906 |
| PAGE SETTING | STAMP (CONFIDENTIAL) | |
| PAGE SETTING | STAMP (INTERNAL USE ONLY) | |
| FINISHING | ONE-SIDED PRINTING | |
| FINISHING | TWO-SIDED PRINTING | |

| ADD AS INHIBITION RULE | CANCEL | HELP |
|---|---|---|
| 907 | 908 | |

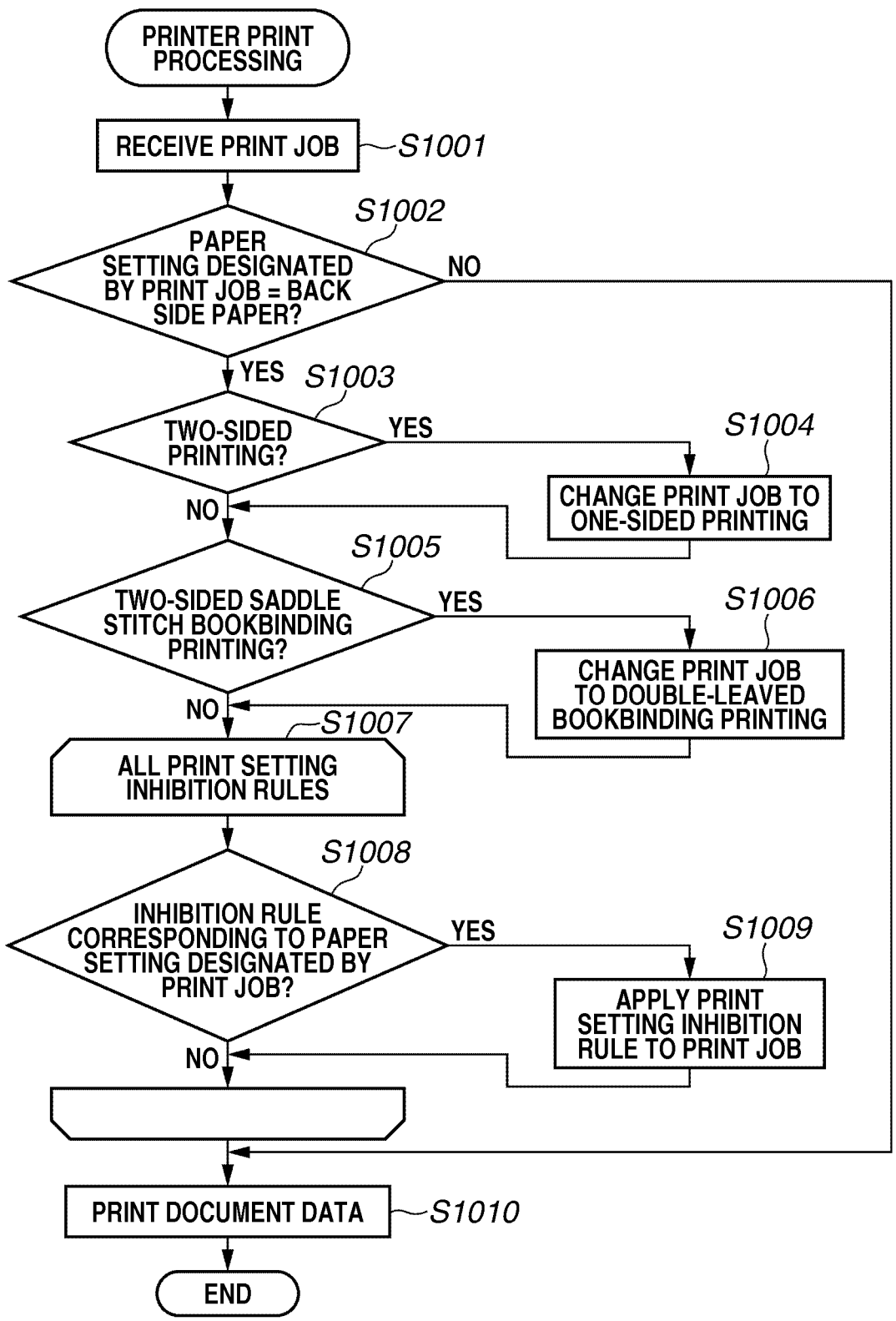

FIG.12A

```
PAPER TYPE MANAGEMENT SETTING

ALL              [V]—1101  ■ SORT OF LIST  REGISTRATION ORDER [V]

| NAME                          | GRAMMAGE  |
   | PLAIN PAPER (80~105 g/m²)     | 72 g/m²   |
   | THICK PAPER (106~128 g/m²)    | 117 g/m²  |
   | BACK SIDE PAPER 1             | 77 g/m²   |   1/6

⌐1102

[DETAILS/   ] [DUPLICATION] [DELETION] [INHIBITION  ]
 [EDITING    ]                          [RULE SETTING]
   1103         1104           1105        1106

[ CANCEL ]—1107
```

FIG.12B

PAPER TYPE INHIBITION RULE SETTING

■ PAPER TYPE CURRENTLY SELECTED: BACK SIDE PAPER 1 —1108

| CATEGORY | SETTING NAME | |
|---|---|---|
| PAGE SETTING | PAGE LAYOUT (1 PAGE/SHEET) | ⤒ |
| PAGE SETTING | PAGE LAYOUT (2 PAGES/SHEET) | ∧ |
| PAGE SETTING | PAGE LAYOUT (4 PAGES/SHEET) | 1/6 |
| PAGE SETTING | STAMP (SECRET) | ∨ |
| PAGE SETTING | STAMP (CONFIDENTIAL) | ⤓ |
| FINISHING | ONE-SIDED PRINTING | |
| FINISHING | TWO-SIDED PRINTING | |

1109

REGISTER    1110

CANCEL    1111

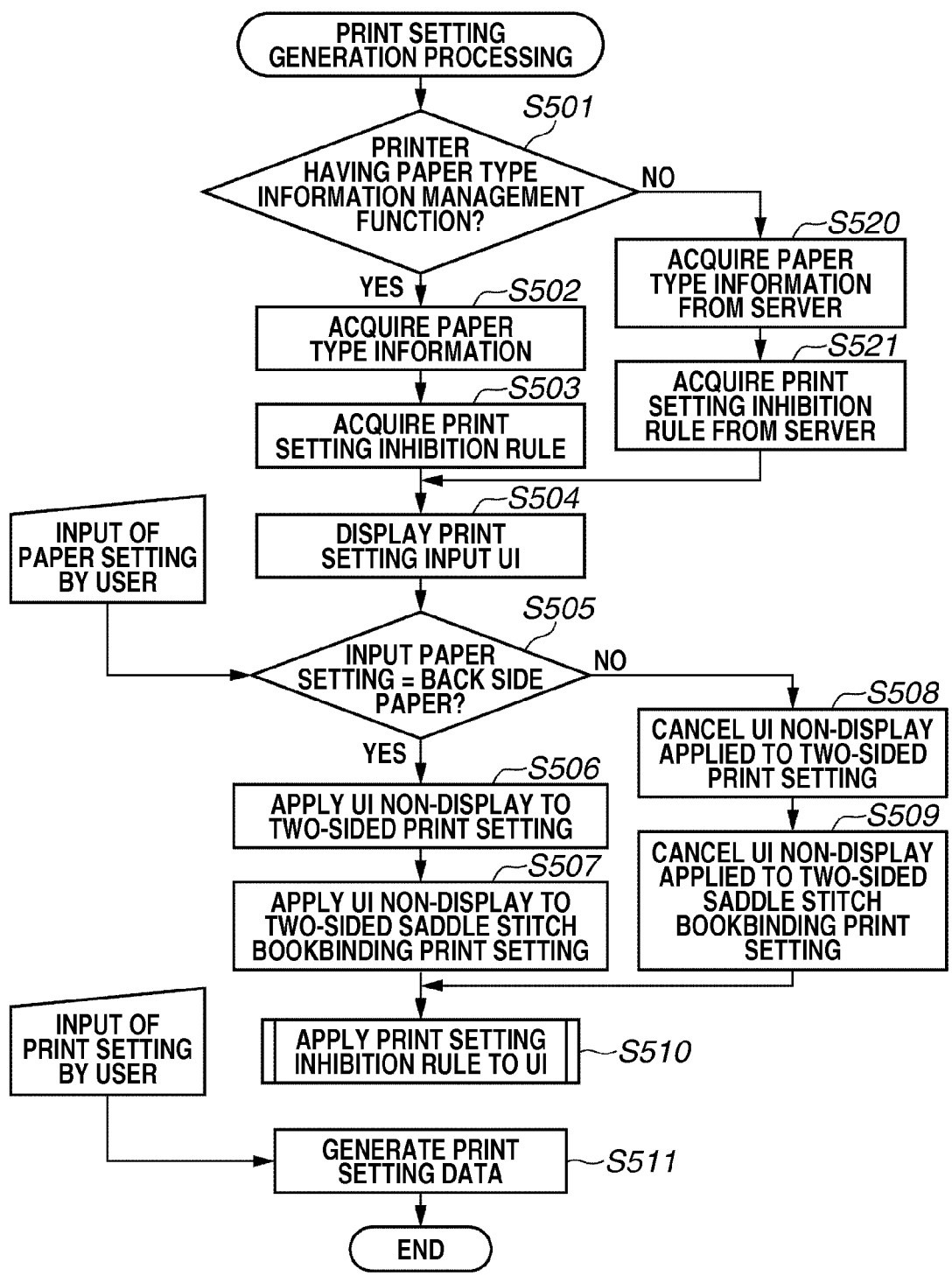

FIG.16

| | NAME | CLASS | GRAMMAGE | SHAPE | SURFACE PROPERTIES | |
|---|---|---|---|---|---|---|
| ☑ | PLAIN PAPER (64~90 g/m²) | BASIC PAPER | 77 g/m² | STANDARD | FINE QUALITY PAPER | EDIT |
| ☐ | BACK SIDE PAPER 1 | PAPER SET BY USER | 77 g/m² | STANDARD | FINE QUALITY PAPER | EDIT |

SETTING OF PAPER TYPE INFORMATION http://localhost/appServer/paperInfoSettings/printer1.aspx

FILE(F) EDIT(E) VIEW(V) FAVORITE(A) TOOL(T) HELP(H)

SETTING OF PAPER TYPE INFORMATION

PAPER TYPE OF PRINTER 1:

1301

1302 — DUPLICATION    DELETE — 1303

ADDITION OF PAPER TYPE

NAME:
CLASS:
GRAMMAGE:
SHAPE:
SURFACE PROPERTIES:

1304

1305 — REGISTER

THE PAGE IS DISPLAYED

FIG.17

| SETTING OF PRINT SETTING INHIBITION RULE | | | | |
|---|---|---|---|---|
| ← → http://localhost/appServer/printSettingConflicts/printer1.aspx | | | | |
| FILE(F) EDIT(E) VIEW(V) FAVORITE(A) TOOL(T) HELP(H) | | | | |

PRINT SETTING INHIBITION RULE OF PRINTER 1

SETTING OF PRINT SETTING INHIBITION RULE:

| | NAME | GRAMMAGE | PRINT SETTING |
|---|---|---|---|
| ☐ | BACK SIDE PAPER 1 | 77 g/m$^2$ | STAMP (CONFIDENTIAL) |
| ☐ | BACK SIDE PAPER 1 | 77 g/m$^2$ | PAGE LAYOUT (2 PAGES/SHEET) |

~1310

[DELETE] ~1311

ADDITION OF PRINT SETTING INHIBITION RULE

PAPER TYPE NAME: [BACK SIDE PAPER 1 ▽]
　　　　　　　　　　～1313
PRINT SETTING: [PAGE LAYOUT (1 PAGE/SHEET) ▽] ~1312
　　　　　　　～1314
　　　　　　　　　　　1315～[REGISTER]

THE PAGE IS DISPLAYED

INFORMATION PROCESSING APPARATUS, PRINTING APPARATUS, PRINTING SYSTEM, INFORMATION PROCESSING APPARATUS CONTROL METHOD, PRINTING APPARATUS CONTROL METHOD, AND COMPUTER-READABLE STORAGE MEDIUM FOR DESIGNATING A PRINT SETTING FOR A PRINT JOB

BACKGROUND OF THE INVENTION

1. Field of the Invention

The present invention relates to an information processing apparatus including a user interface that is operable to designate a print setting for a print job to be printed by a printing apparatus. The present invention further relates to a printing apparatus, a printing system, a method for controlling an information processing apparatus, a method for controlling a printing apparatus, and a computer-readable storage medium storing computer-executable instructions.

2. Description of the Related Art

When the need for reducing the amount of printing paper used is taken into consideration, it is useful to perform printing on a back side of printed paper. However, if back side paper is used for two-sided printing or two-sided saddle stitch bookbinding printing, the result of a printed output may be dissatisfactory for users although the print processing is physically feasible. Therefore, it is desired to provide an appropriate method for preventing any failure in the print processing.

As discussed in Japanese Patent Application Laid-Open No. 2002-215353, a conventional print setting generation method applicable to an information processing apparatus includes inquiring whether generated print settings are an infeasible combination of settings and, if the combination is infeasible, changing the infeasible combination to a feasible combination of print settings.

Further, as discussed in Japanese Patent Application Laid-Open No. 2006-236382, there is a conventional method for generating beforehand a complement processing rule to eliminate any inconsistency (conflict) between print setting items and updating display of a print setting generation user interface according to the complement processing rule.

The above-described conventional print setting generation method is limited to only determining whether the print processing is physically feasible. Therefore, the conventional print setting generation method is not effective to prevent a failure peculiar to the print processing using back side paper.

SUMMARY OF THE INVENTION

Exemplary embodiments of the present invention are directed to a method capable of preventing any failure that may occur in print processing using the back side of printed paper.

According to an aspect of the present invention, an information processing apparatus includes a user interface that is operable to designate a print setting for a print job to be printed by a printing apparatus. The information processing apparatus includes a paper type information acquisition unit configured to acquire paper type information from the printing apparatus, as information indicating paper stored in the printing apparatus, wherein the paper type information includes information usable to determine whether an acquired paper type is one-sided printed paper that has a printed surface on which printing is already performed and an unprinted surface to be used for printing; a print setting inhibition rule management unit configured to store and manage a print setting to be designated as an inhibition rule when printing using the one-sided printed paper is performed, as print setting inhibition rule information, in association with the paper type information usable to identify the one-sided printed paper; a paper type determination unit configured to determine whether a paper setting included in the print setting designated by the user interface is a setting corresponding to the paper type information usable to identify the one-sided printed paper based on the paper type information acquired by the paper type information acquisition unit; a print setting inhibition rule determination unit configured to determine whether print setting inhibition rule information associated with the paper type information corresponding to the designated paper setting is stored and managed by the print setting inhibition rule management unit, if the paper type determination unit determines that the designated paper setting is the setting corresponding to the paper type information usable to identify the one-sided printed paper; and a control unit configured to perform control to prevent the print setting set as an inhibition rule in the print setting inhibition rule information from being designated by the user interface, if the print setting inhibition rule determination unit determines that the print setting inhibition rule information associated with the paper type information corresponding to the designated paper setting is stored and managed by the print setting inhibition rule management unit.

Exemplary embodiments of the present invention can prevent any failure that may occur in print processing using one-sided printed paper.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 9A and 9B illustrate examples of a print setting inhibition rule setting UI according to the first exemplary embodiment of the present invention.

FIG. 11 is a flowchart illustrating an example procedure of print processing that can be performed by a printer.

FIGS. 12A and 12B illustrate examples of a UI that can be displayed on an operation unit of the printer.

FIG. 15 is a flowchart illustrating details of print setting generation processing according to the third exemplary embodiment of the present invention.

FIG. 16 illustrates an example of a paper type information registration UI according to the third exemplary embodiment of the present invention.

FIG. 17 illustrates an example of a print setting inhibition rule registration UI according to the third exemplary embodiment of the present invention.

DESCRIPTION OF THE EMBODIMENTS

Various exemplary embodiments, features, and aspects of the invention will be described in detail below with reference to the drawings.

Figure 1:
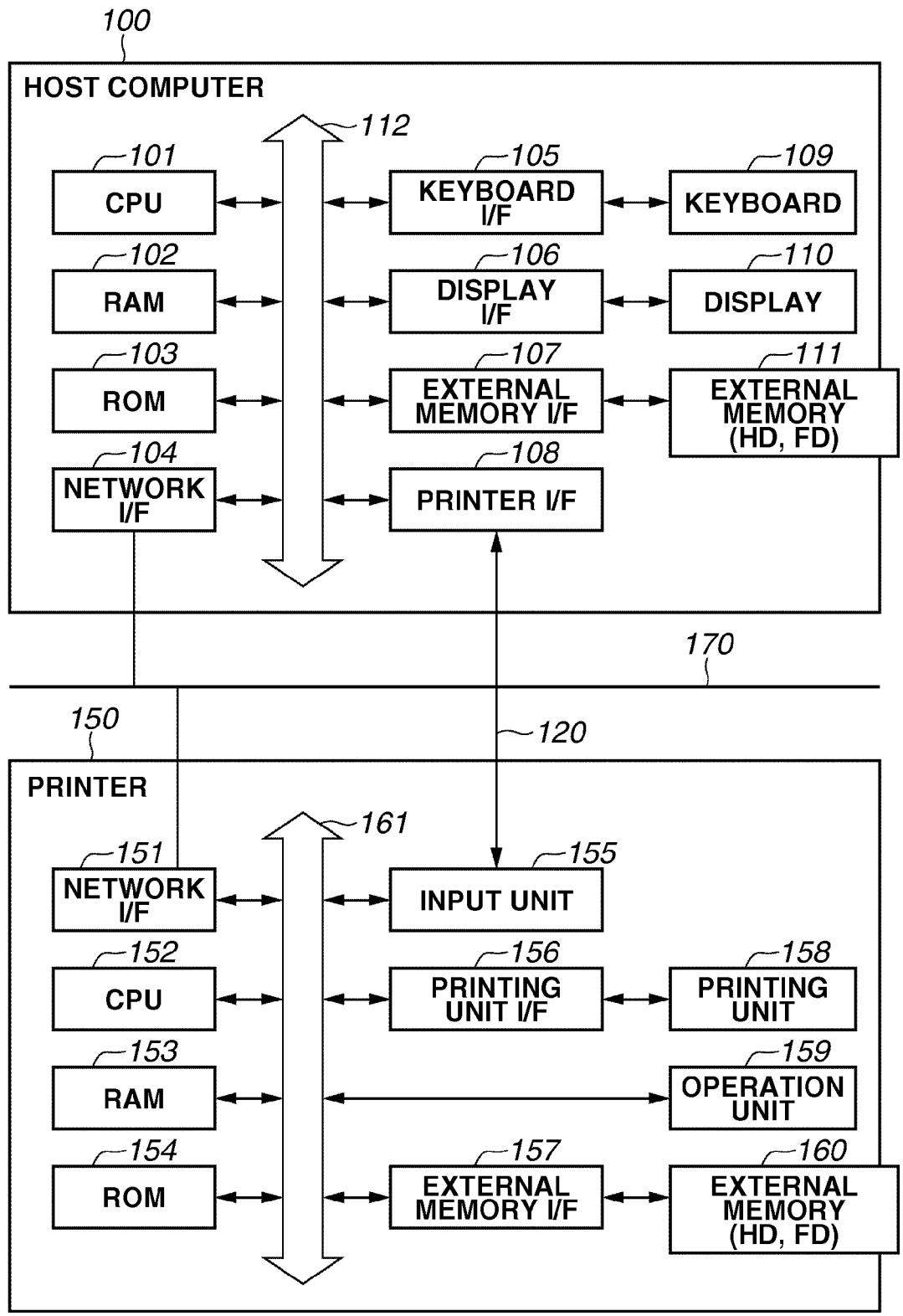
FIG. 1 is a block diagram illustrating an example configuration of a printing system according to a first exemplary embodiment of the present invention.

FIG. 1 is a block diagram illustrating an example configuration of a printing system including an information processing apparatus and a printing apparatus according to a first exemplary embodiment of the present invention.

In FIG. 1, a host computer 100 can operate as an information processing apparatus. A central processing unit (CPU) 101 can integrally control each device connected to a system bus 112 according to a program stored in a read only memory (ROM) 103 or an external memory 111. Further, the CPU 101 can execute document processing to be performed on a document including graphics, images, characters, and tables (including spreadsheets) according to a document processing program stored in the external memory 111.

The CPU 101, for example, executes processing for rasterizing outline fonts into a display information RAM having been set on a random access memory (RAM) 102 and implements "what you see is what you get" (WYSIWYG) processing on a display unit 110. Further, the CPU 101 opens various windows registered beforehand if a corresponding command is input with a mouse cursor (not illustrated) on the display unit 110 and executes various data processing. The CPU 101 opens print setting windows required for print processing and enables users to perform settings of a print processing method for a printer driver that includes settings for a printer and selection of a print mode.

The RAM 102 can functionally operate as a main memory or a work area for the CPU 101. The ROM 103 is a read only memory that can functionally operate as a storage area of a basic I/O program.

A network interface (network I/F) 104 can connect the host computer 100 to a network 170 to perform network communications. A keyboard I/F 105 can control various signals input via a keyboard 109 or a pointing device (not illustrated). A display I/F 106 can control displays to be performed on the display unit 110.

An external memory I/F 107 can control accesses to the external memory 111, such as a hard disk (HD) and a floppy disk (FD). A printer I/F 108 is connected to a printer 150 via a predetermined bidirectional interface 120 and can execute control processing for communications performed between the host computer 100 and the printer 150.

The external memory 111 can store an operating system program (OS) serving as a control program to be executed by the CPU 101, various applications, font data usable in the document processing, other various data, user files, editing files, and printer drivers.

The host computer 100 can operate in a state where the CPU 101 executes the basic I/O program or the OS written in the ROM 103 or the external memory 111. The basic I/O program is written in the ROM 103. The OS is written in the ROM 103 or the external memory 111.

The basic I/O program includes an initial program loading function, according to which the OS is loaded from the ROM 103 or the external memory 111 into the RAM 102 in response to a power source turning-on operation of the host computer 100 and an OS operation is automatically started. The system bus 112 connects the above-described devices 101 to 108 with each other so that these devices can communicate with each other.

The printer 150 serves as a printing apparatus. In the printer 150, a network I/F 151 can connect the printer 150 to the network 170 to perform network communications. The printer 150 includes a CPU 152 that outputs an image signal (output information) to a printing unit (printer engine) 158 via a printing unit I/F 156 connected to a system bus 161 based on a control program.

The control program to be executed by the CPU 152 is stored in a ROM 154 or in an external memory 160. The CPU 152 can communicate with the host computer 100 via an input unit 155. The CPU 152 is configured to transmit information of the printer 150 to the host computer 100.

A RAM 153 can functionally operate as a main memory or a work area for the CPU 152. An optional RAM can be connected to an expansion port (not illustrated) to expand the memory capacity. The RAM 153 can be used as an output information rasterization area, an environmental data storage area, or a nonvolatile RAM (NVRAM).

The ROM 154 or the external memory 160 (e.g., a hard disk) can store a control program for the CPU 152, font data usable when the above-described output information is generated, and information usable by the computer.

The input unit 155 can receive communication information from the host computer 100. The printing unit I/F 156 can output an image signal (output information) to the printing unit (printer engine) 158. The printing unit (printer engine) 158 can perform printing on a recording sheet based on an input from the printing unit I/F 156. An operation unit 159 is, for example, an operation panel that includes various switches and keys to be operated and an LED display unit.

An external memory I/F (memory controller) 157 can control accesses to the external memory 160 (e.g., a hard disk (HD), an IC card, etc.). The external memory 160 is connected to the printer 150 as an optional device and can store font data, emulation programs, and form data. Further, the number of the external memory 160 is not limited to only one.

For example, the printer 150 can be connected to two or more external memories that store optional font cards in addition to built-in fonts and language programs that can interpret different printer control languages.

Further, the printer 150 includes an NVRAM (not illustrated) that can store printer mode setting information entered via the operation unit 159. The system bus 161 connects the above-described devices 151 to 157 so that these devices can communicate with each other.

Figure 2:
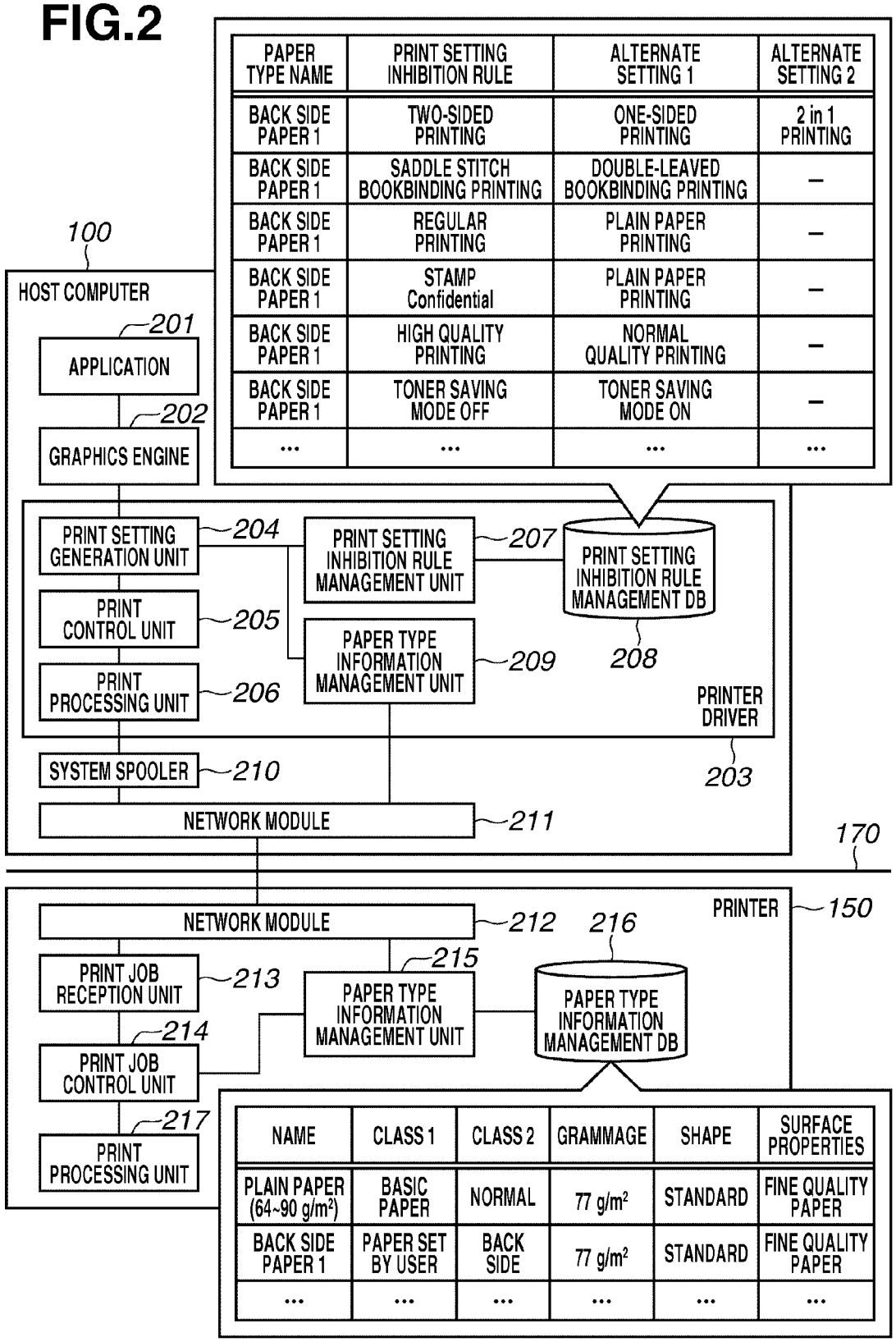
FIG. 2 is a block diagram illustrating an application configuration of the printing system according to the first exemplary embodiment of the present invention.

FIG. 2 is a block diagram illustrating an application configuration of the printing system according to the first exemplary embodiment. The host computer 100 includes an application 201, a graphics engine 202, a printer driver 203, a system spooler 210, and a network module 211 that are present as files stored in the external memory 111.

Each of the above-described files is a program module that is loaded into the RAM 102 and executed by the OS or a module that uses the loaded program module. More specifically, the CPU 101 executes the above-described program modules to realize the functions of the application 201, the graphics engine 202, the printer driver 203, the system spooler 210, and the network module 211.

Further, the application 201 and the printer driver 203 can be added to an FD or a compact disc ROM (CD-ROM), which serves as the external memory 111, or via the network 170 to a HD serving as the external memory 111. The CPU 101 can execute the application 201 loaded from the external memory 111 to the RAM 102.

The application 201 is a document print application that can transmit document information as print data to the printer driver 203. The graphics engine 202 can perform screen drawing. In general, the OS of the host computer 100 has a function equivalent to that of the graphics engine 202. Alternatively, the graphics engine 202 can be realized by an independent application.

The printer driver 203 can control print data. The printer driver 203 includes a print setting generation unit 204, a print control unit 205, a print processing unit 206, a print setting inhibition rule management unit 207, a print setting inhibition rule management DB 208, and a paper type information management unit 209.

The print setting generation unit 204 can acquire print setting inhibition rule information and paper type information from the print setting inhibition rule management unit 207 and the paper type information management unit 209, and can generate print settings based on the acquired information.

The print control unit 205 can convert print data and print settings into a print command (print job) that may be referred to as Page Description Language (PDL). The print processing unit 206 can transmit the print job (i.e., a PDL command) to the system spooler 210.

The print setting inhibition rule management unit 207 associates the paper type information managed by the paper type information management unit 209 with the print setting inhibition rule information (i.e., inhibition rules to be applied when the print settings are generated). The print setting inhibition rule management unit 207 stores the associated information into the print setting inhibition rule management DB 208 and manages the stored information. The print setting inhibition rule management DB 208 can be realized by a storage area of the external memory 111.

Further, the print setting inhibition rule information stored in the print setting inhibition rule management DB 208 includes any print settings that can be set by the printer driver 203, such as two-sided printing, two-sided saddle stitch bookbinding printing, regular printing for generating an official document, stamp, high-quality printing, toner saving mode OFF, and copy-forgery-inhibited pattern printing.

In the context of the present exemplary embodiment, the "two-sided saddle stitch bookbinding printing" indicates a bookbinding method including folding sheets of two-sided printed paper being stacked and stitching them along a spine line from the front cover side to the middle of the two-page spread.

Further, an alternate setting replaceable with a print setting that is included in the print setting inhibition rule information can be also managed as part of the print setting inhibition rule information. For example, in a case where the two-sided saddle stitch bookbinding printing is inhibited, it is useful to replace a corresponding print setting with double-leaved bookbinding printing.

Further, in the context of the present exemplary embodiment, the "double-leaved bookbinding printing" indicates a bookbinding method including performing printing on only one surface of paper, folding into two a sheet of printed paper with its printed surface facing outside, and stitching the sheet at the side opposite the fold line.

As a version of the present exemplary embodiment, it is useful to provide a plurality of alternate settings (e.g., alternate setting 1 and alternate setting 2) to allow a user to select a desired alternate setting. Further, if the alternate setting 1 is unsettable, it is useful to automatically set the alternate setting 2.

To prevent any failure that may occur in print processing using the back side of printed paper, it is useful to register beforehand a print setting to be designated as an inhibition rule when the print processing using the back side paper is performed (i.e., a print setting that may induce a print failure), in the print setting inhibition rule management DB 208, in association with paper type information relating to the back side paper (i.e., paper type information usable to identify the back side paper).

For example, the failure that may occur in print processing using the back side of printed paper can be prevented by registering beforehand a print setting including a process of performing printing on both sides of paper (e.g., two-sided print setting, two-sided saddle stitch bookbinding setting, etc.) as print setting inhibition rule information in association with the back side paper.

The paper type information management unit 209 can acquire paper type information from the printer 150 via the network module 211 and can manage the acquired paper type information. The system spooler 210 can successively transmit print jobs to the printer 150 via the network module 211. The network module 211 can perform network communications with the printer 150 using arbitrary communication protocols.

The printer 150 includes a network module 212, a print job reception unit 213, a print job control unit 214, a paper type information management unit 215, a paper type information management DB 216, and a print processing unit 217. To realize the above-described functional units 212 to 215 and 217, the CPU 101 executes a program loaded from the ROM 154. Further, a storage area of the external memory 160 can be used to realize the paper type information management DB 216.

The network module 212 can perform network communications with the host computer 100 using arbitrary communication protocols. The print job reception unit 213 can receive a print job from the network module 212 and send the received print job to the print job control unit 214. The print job control unit 214 can acquire paper type information from the paper type information management unit 215 and control the print job based on the acquired paper type information. The print job control unit 214 outputs the print job as a PDL command to the print processing unit 217.

The paper type information management unit 215 can store the paper type information into the paper type information management DB 216 and manage the stored paper type information. To this end, the paper type information management unit 215 registers the paper type information to the paper type information management DB 216 and reads the registered information from the paper type information management DB 216.

The paper type information management DB 216 stores the paper type information received from the paper type information management unit 215. For example, the information that can be stored as the paper type information includes items of paper type name, class, grammage, shape, and surface properties.

Further, the storable paper type information includes information that can be referred to in determining whether the paper type is one-sided printed paper (hereinafter, referred to as "back side paper"), as indicated in the field of class 2.

The above-described back side paper (one-sided printed paper) indicates the type of paper (stored in a printer) that has a printed surface on which printing is already performed and an unprinted surface to be used for printing. Further, the information usable to determine whether the paper type is the back side paper is not limited to information directly indicating the back side paper (e.g., "back side paper" in a case where the target paper is the back side paper, or "normal" in a case where the target paper is paper having two (front and back) printable surfaces). For example, the information usable to identify the back side paper includes information indicating printable areas on the front and back surfaces of paper.

The print processing unit 217 can receive a PDL command from the print job control unit 214 and can perform print processing based on the received PDL command.

Figure 3:
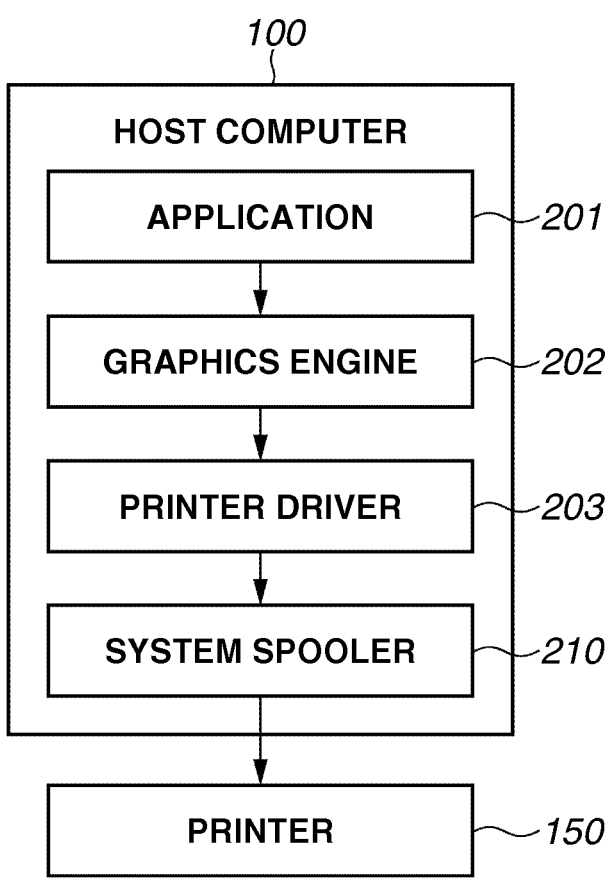
FIG. 3 illustrates a typical configuration of print processing that can be performed by a host computer.

FIG. 3 illustrates a typical configuration of print processing that can be performed by the host computer 100, which is connected directly, or via a network, to a printing apparatus (such as the printer 150).

The OS (not illustrated) loaded into the RAM 102 by the CPU 101 can execute the application 201 loaded from the external memory 111 into the RAM 102. When the application 201 requests the printer 150 to perform printing, the graphics engine 202 loaded into the RAM 102 by the OS can be used to perform print output operation.

The graphics engine 202 can load the printer driver 203, which is prepared for each printing apparatus, into the RAM 102 from the external memory 111. The graphics engine 202 uses the printer driver 203 to convert an output of the application 201 into a PDL command.

The system spooler 210 loaded into the RAM 102 by the OS outputs the converted PDL command to the printer 150 via the interface 120 or the network 170.

Figure 4:
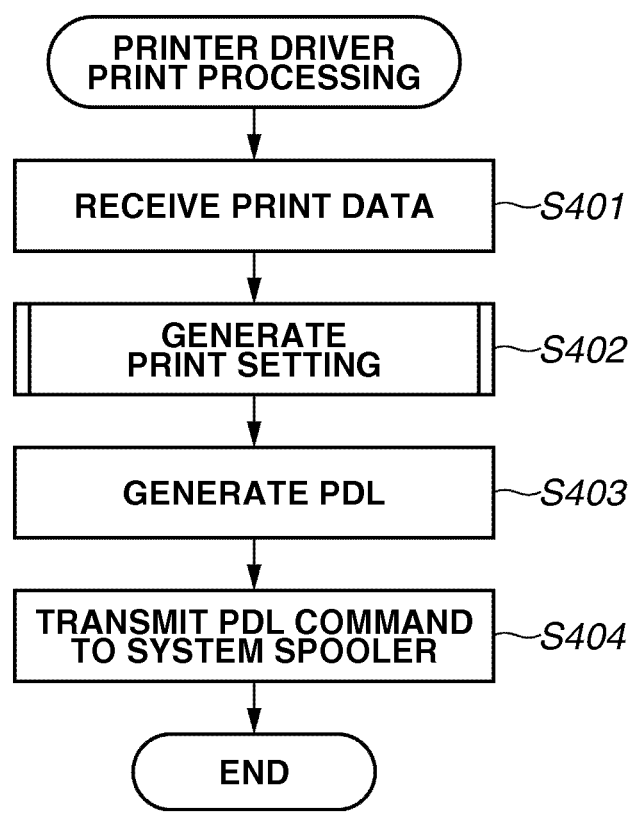
FIG. 4 is a flowchart illustrating an example of print processing that can be performed by a printer driver according to the first exemplary embodiment of the present invention.

An example of the print processing that can be performed by the printer driver 203 is described below with reference to the flowchart illustrated in FIG. 4. FIG. 4 is a flowchart illustrating an example of the print processing that can be performed by the printer driver 203 according to the first exemplary embodiment. The program of the printer driver 203 relating to the flowchart illustrated in FIG. 4 is stored in the external memory 111 of the host computer 100 and can be loaded into the RAM 102 by the CPU 101 so that the OS can execute the loaded program.

In a case where printing of a document is executed by the application 201, the graphics engine 202 invokes the printer driver 203 and the print setting generation unit 204 starts the processing illustrated in the flowchart illustrated in FIG. 4.

First, in step S401, the print setting generation unit 204 receives document data from the application 201. Next, in step S402, the print setting generation unit 204 displays a user interface (UI) that enables a user to input print settings. Then, the print setting generation unit 204 receives the print settings instructed by the user via the UI, and generates print setting data based on the received print settings and the document data received from the application 201.

Further, the print setting generation unit 204 sends the generated print setting data to the print control unit 205. The print setting generation processing to be performed in step S402 is described below in more detail with reference to flowcharts illustrated in FIGS. 5A and 5B.

Next, in step S403, the print control unit 205 converts the print setting data received from the print setting generation unit 204 into a PDL command and sends the generated PDL command to the print processing unit 206. Then, in step S404, the print processing unit 206 transmits the PDL command received from the print control unit 205 to the system spooler 210.

An example of the print setting generation processing to be performed by the printer driver 203 (see step S402) according to the present exemplary embodiment is described below with reference to the flowcharts illustrated in FIGS. 5A and 5B.

Figure 5A:
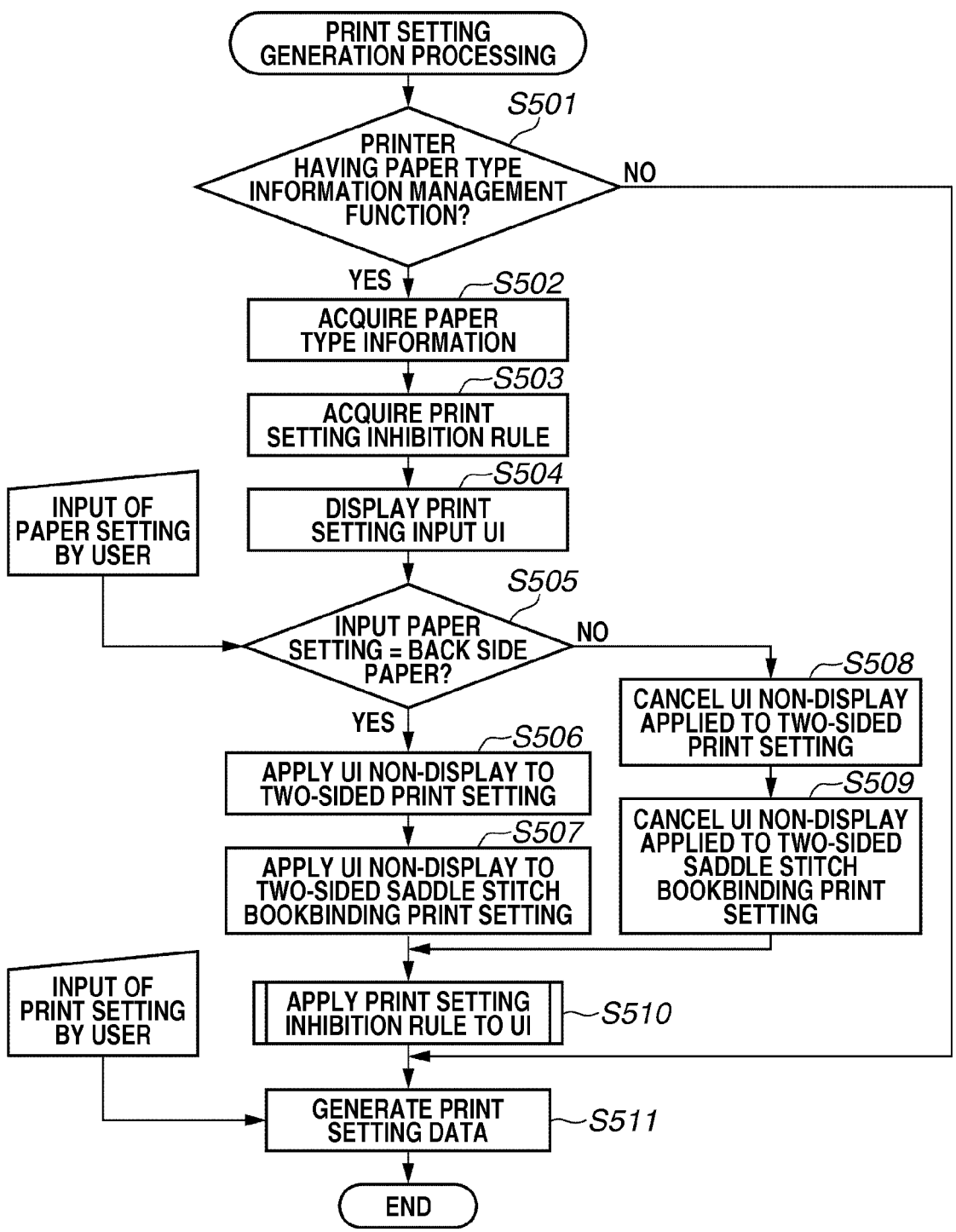
FIGS. 5A and 5B are flowcharts illustrating an example of print setting processing according to the first exemplary embodiment of the present invention.
Figure 5B:
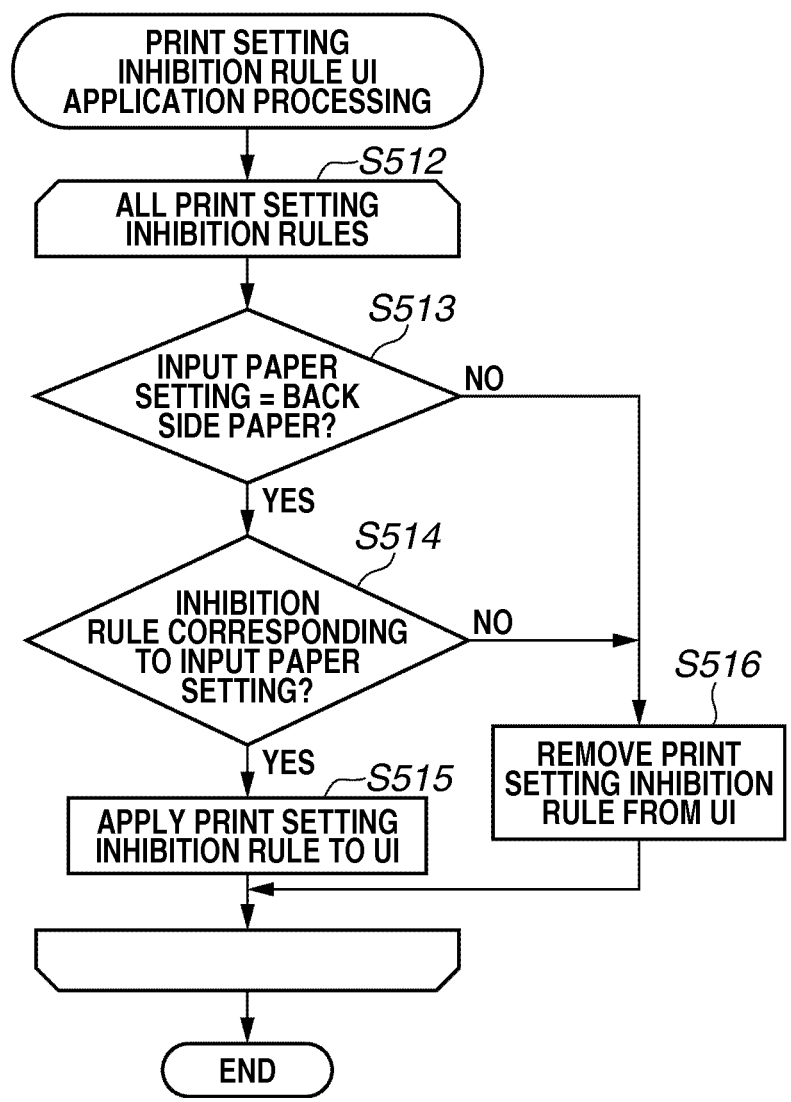

FIGS. 5A and 5B are flowcharts illustrating an example of the print setting processing to be performed in step S402 illustrated in FIG. 4. The print setting generation unit 204 can execute the processing of the flowcharts illustrated in FIGS. 5A and 5B. To this end, the CPU 101 loads a printer driver program recorded in the external memory 111 into the RAM 102 so that the OS can execute the loaded program.

First, in step S501, the print setting generation unit 204 determines whether the printer 150 has a paper type information management function. For example, to determine whether the printer 150 has the paper type information management function, the paper type information management unit 209 can be used to determine whether the paper type information is obtainable from the printer 150 via the network 170.

If the print setting generation unit 204 determines that the printer 150 does not have the paper type information management function (NO in step S501), the processing proceeds to step S511. On the other hand, if the print setting generation unit 204 determines that the printer 150 has the paper type information management function (YES in step S501), the processing proceeds to step S502.

In step S502, the print setting generation unit 204 acquires paper type information from the printer 150 via the paper type information management unit 209.

Then, in step S503, the print setting generation unit 204 acquires print setting inhibition rule information stored in the print setting inhibition rule management DB 208 via the print setting inhibition rule management unit 207. The print setting inhibition rule information includes inhibition rule information other than the above-described general inhibition rule applied to the back side of printed paper, such as two-sided printing and two-sided saddle stitch bookbinding printing.

Next, in step S504, the print setting generation unit 204 controls the display I/F 106 to display a print setting input user interface (UI) on the display unit 110 to enable a user to input print settings. The print setting generation unit 204 receives print settings input by the user.

Figure 6A:
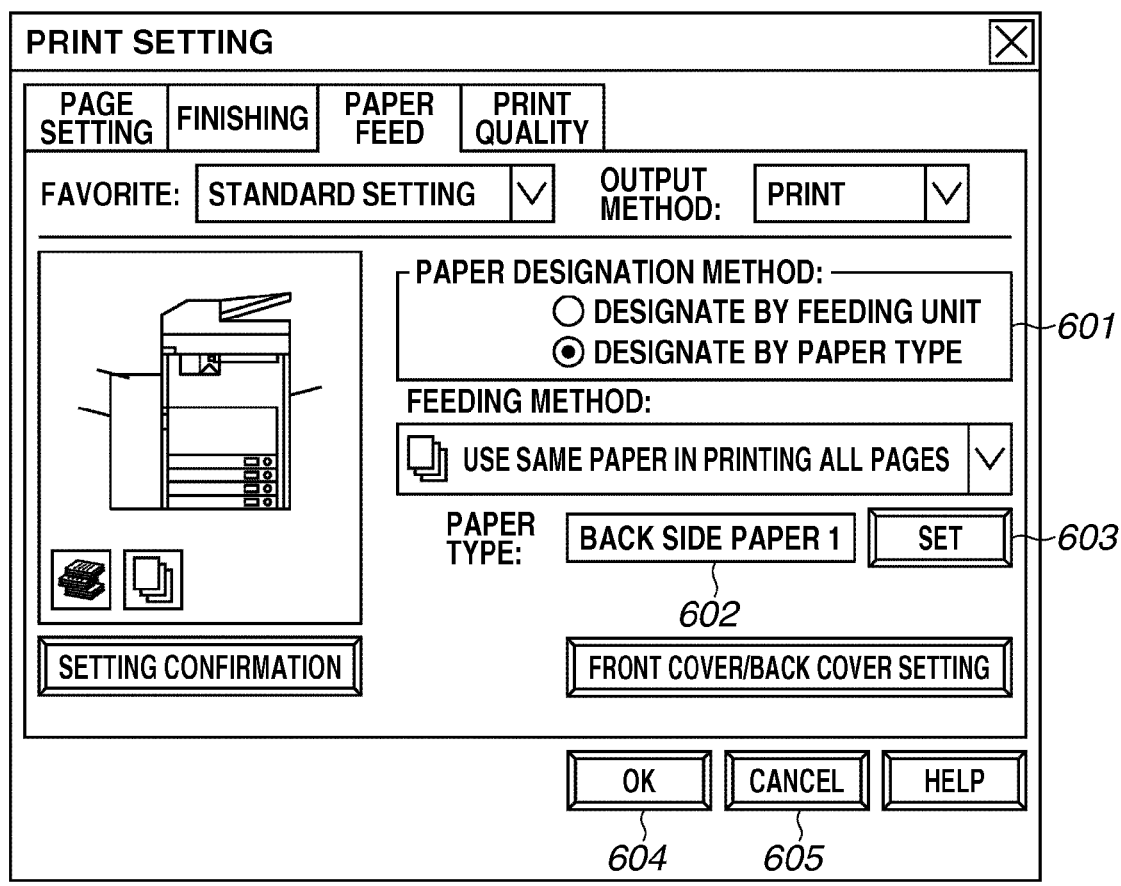
FIGS. 6A and 6B illustrate examples of a print setting input user interface (UI).

The print setting items that can be set by the user via the print setting input UI include paper related settings, such as paper type, paper feeding unit, and paper size. FIG. 6A illustrates an example of the print setting input UI, which is described below in detail. If the print setting generation unit 204 detects a paper setting input by the user via the print setting input UI, the processing proceeds to step S505.

In step S505, the print setting generation unit 204 determines whether the paper setting input by the user is the back side paper (i.e., performs paper type determination processing). In a case where the user designates paper by the paper type in setting the paper, the print setting generation unit 204 can check whether the paper type input by the user is the back side paper to determine whether the paper setting input by the user is the back side paper.

Further, in a case where the user designates paper by relevant information other than the paper size (e.g., paper feeding unit, paper size, etc.) in setting the paper, the print setting generation unit 204 acquires information associating the relevant information with the paper type from the printer 150.

Then, the print setting generation unit 204 determines whether the paper setting input by the user is the back side paper by checking whether the relevant information (e.g., paper feeding unit, paper size, etc.) input by the user is associated with the back side paper.

If it is determined that the paper setting input by the user is the back side paper (YES in step S505), the print setting generation unit 204 executes the processing in steps S506 and S507 to prevent the user from setting the two-sided printing and the two-sided saddle stitch bookbinding printing (i.e., general inhibition rules applied to the back side paper) on the setting input UI.

Namely, through the processing in steps S506 and S507, the print setting generation unit 204 excludes the print setting inhibition rules corresponding to the above-described print setting inhibition rule information acquired in step S503 from the general inhibition rule information, which is applied to the back side paper on the UI.

Figure 7A:
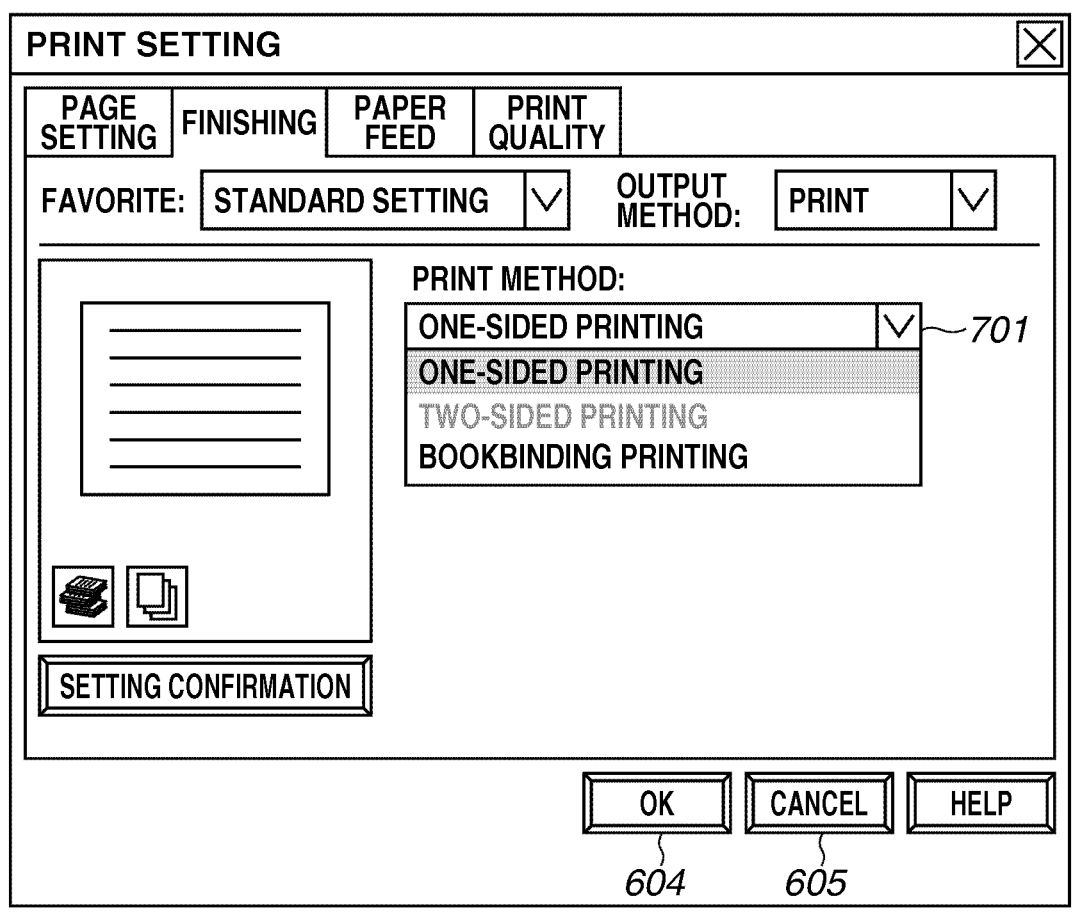
FIGS. 7A and 7B illustrate examples of the print setting input UI.

In step S506, the print setting generation unit 204 brings an item indicating the two-sided print setting on the print setting input UI into a non-displayed state (i.e., a non-settable state). FIG. 7A illustrates an example of the non-displayed state of the two-sided print setting item on the print setting input UI. The illustrated content in FIG. 7A is described below in more detail.

In step S507, the print setting generation unit 204 brings an item indicating the two-sided saddle stitch bookbinding print setting on the print setting input UI into a non-displayed state (i.e., a non-settable state).

Figure 7B:
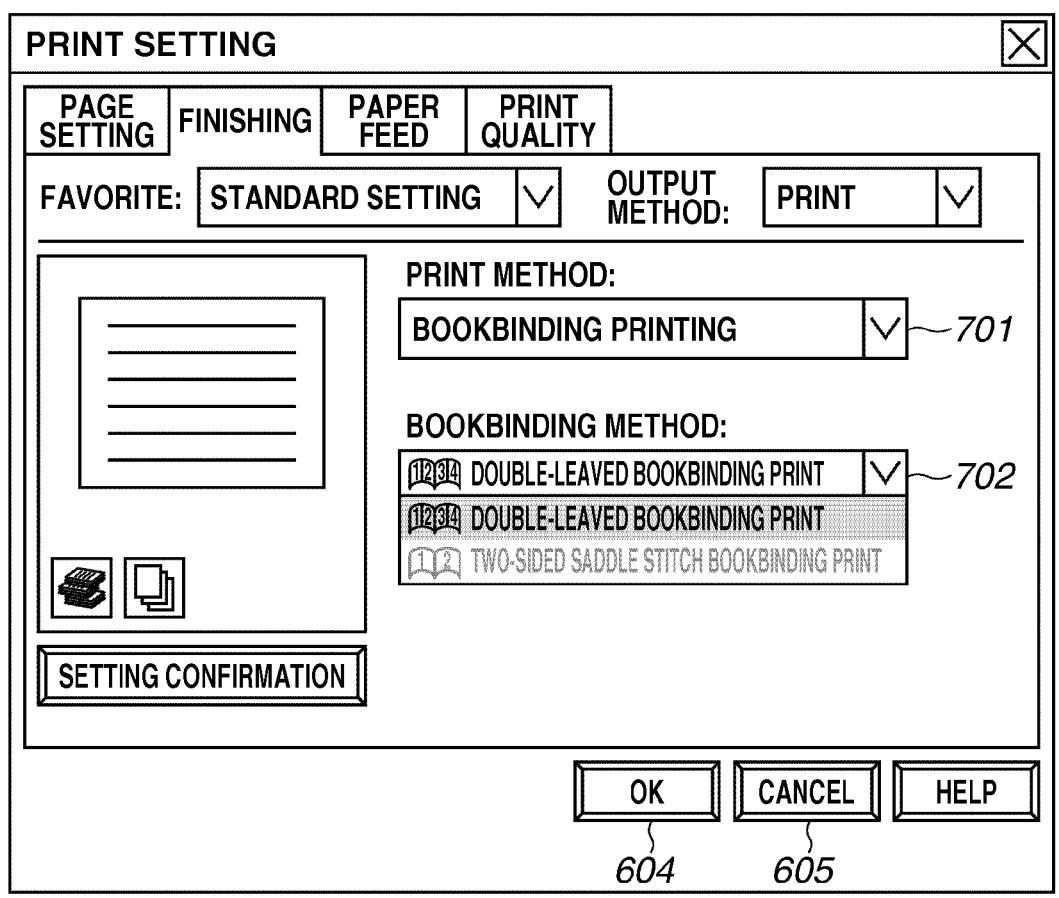

FIG. 7B illustrates an example of the non-displayed state of the two-sided saddle stitch bookbinding print setting item on print setting input UI. The illustrated content in FIG. 7B is described below in more detail.

In a case where the print setting inhibition rule information managed by the print setting inhibition rule management unit 207 includes any alternate setting, it is desired to display a warning and automatically select the alternate setting in a setting selection operation, instead of performing the above-described inhibited print setting non-display processing to be performed in steps S506 and S507.

If the above-described processing in steps S506 and S507 is completed, the processing proceeds to step S510.

On the other hand, if it is determined that the paper setting input by the user is not the backside paper (NO in step S505), the print setting generation unit 204 executes the processing in steps S508 and S509 to enable the user to set the two-sided printing or the two-sided saddle stitch bookbinding printing on the setting input UI. In other words, the print setting generation unit 204 cancels the non-displayed state of the above-described setting items.

In step S508, the print setting generation unit 204 brings the two-sided print setting item on the print setting input UI into a displayed state (i.e., a settable state). In step S509, the print setting generation unit 204 brings the two-sided saddle stitch bookbinding print setting item on the print setting input UI into a displayed state (i.e., a settable state).

Namely, in steps S508 and S509, the print setting generation unit 204 cancels general inhibition rules relating to the back side paper to the UI, except for the print setting inhibition rules corresponding to the above-described print setting inhibition rule information acquired in step S503. If the above-described processing in steps S508 and S509 is completed, the processing proceeds to step S510.

Next, in step S510, the print setting generation unit 204 executes processing for applying the print setting inhibition rules corresponding to the above-described print setting inhibition rule information acquired in step S503 to the UI. The above-described print setting inhibition rules are inhibition rules other than the general inhibition rules relating to the back side paper (e.g., two-sided printing, two-sided saddle stitch bookbinding printing, etc.).

An example of print setting inhibition rule UI application processing (i.e., details of the above-described processing to be performed in step S510) is described below in steps S512 to S515 with reference to FIG. 5B.

First, in step S512, the print setting generation unit 204 successively controls all print setting inhibition rules corresponding to the above-described print setting inhibition rule information acquired in step S503 as a processing object to be subjected to the processing in steps S513 to S516.

In step S513, the print setting generation unit 204 determines whether the paper setting input by the user is the back side paper (i.e., performs paper type determination processing similar to the processing in step S505). Then, if the print setting generation unit 204 determines that the paper setting is the back side paper (YES in step S513), the processing proceeds to step S514. If it is determined that the paper setting is not the back side paper (NO in step S513), the processing proceeds to step S516.

In step S514, the print setting generation unit 204 determines whether the print setting inhibition rule of the present processing object is a print setting inhibition rule associated with the paper setting input by the user (i.e., performs print setting inhibition rule determination processing).

If the print setting generation unit 204 determines that the print setting inhibition rule of the present processing object is the print setting inhibition rule associated with the paper setting input by the user (YES in step S514), the processing proceeds to step S515. On the other hand, if it is determined that the print setting inhibition rule of the present processing object is not the print setting inhibition rule associated with the paper setting input by the user (NO in step S514), the processing proceeds to step S516.

In step S515, the print setting generation unit 204 applies the print setting inhibition rule of the present processing object to the setting input UI. For example, in a case where the print setting inhibition rule of the present processing object is "the usage of a back side paper is inhibited in an arbitrary regular printing for the generation of an official document", the print setting generation unit 204 performs non-display control so as to prevent the arbitrary regular printing from being selected on the setting input UI.

In this case, if an alternate setting replaceable with the print setting inhibition rule of the present processing object is included in the print setting inhibition rule information, it is useful to display a warning when the regular printing is selected and replace the inhibited setting with the alternate setting.

Further, in step S516, the print setting generation unit 204 removes the print setting inhibition rule of the present processing object from the setting input UI. For example, in a case where the print setting inhibition rule of the present processing object is "the usage of a back side paper is inhibited in an arbitrary regular printing generating an official document", the print setting generation unit 204 performs a display control so that the arbitrary regular printing can be selected on the setting input UI (i.e., cancels the non-display state).

If the above-described processing in steps S515 or S516 is completed, the print setting generation unit 204 determines whether the processing in steps S513 to S516 has been executed for all of the above-described print setting inhibition rules. If there is any print setting inhibition rule that is not subjected to the above-described processing in steps S513 to S516, the print setting generation unit 204 designates the next print setting inhibition rule as a processing object and repeats the above-described processing in steps S513 to S516.

On the other hand, if the processing in steps S513 to S516 has been executed for all of the above-described print setting inhibition rules, the print setting generation unit 204 terminates the print setting inhibition rule UI application processing (i.e., the processing performed in step S510).

If the above-described processing in step S510 is completed, the print setting generation unit 204 accepts another print setting input by the user. Although not illustrated in the drawings, if the print setting generation unit 204 detects another paper setting input via the print setting input UI, the processing proceeds to step S505.

If the print setting generation unit 204 detects completion of the print setting input operation (e.g., detects user's pressing an OK button 604), then in step S511, the print setting generation unit 204 acquires the print setting input by the user via the UI and generates print setting data. Then, the print setting generation unit 204 terminates the print setting generation processing (i.e., the processing performed in step S402).

According to the example processing illustrated in FIGS. 5A and 5B, specific inhibition rules other than the general inhibition rules are registered beforehand in the print setting inhibition rule management DB 208 and the print setting generation unit 204 separately performs the processing in steps S505 to S509 to be applied to the general inhibition rules and the processing in step S510 to be applied to the specific inhibition rules.

However, it is also useful that all inhibition rules including the general inhibition rules are registered beforehand in the print setting inhibition rule management DB 208 and the print setting generation unit 204 performs the processing in step S510 for each inhibition rule stored in the print setting inhibition rule management DB 208. In this case, the print setting generation unit 204 can skip the above-described processing in steps S505 to S509.

FIGS. 6A and 6B and FIGS. 7A and 7B illustrate various examples of the print setting input UI. FIG. 6A illustrates an example of the print setting input UI that can be displayed by the print setting generation unit 204 in step S504 illustrated in FIG. 5A.

In FIG. 6A, a paper designation method selection field 601 displays paper designation methods that are selectable in the print setting. In the present exemplary embodiment, the paper designation method is selectable between a designation method based on a paper feeding unit (e.g., cassette, manual feeding tray, etc.) and a designation method based on a paper type.

The UI example illustrated in FIG. 6A, which is displayed when the designation by the paper type is selected, includes a paper type information display field 602 and a paper type setting button 603. If another paper designation method (e.g., the designation by the paper feeding unit) is selected, the UI is partly changed according to the paper designation method. For example, paper feeding unit information can be additionally displayed.

Figure 6B:
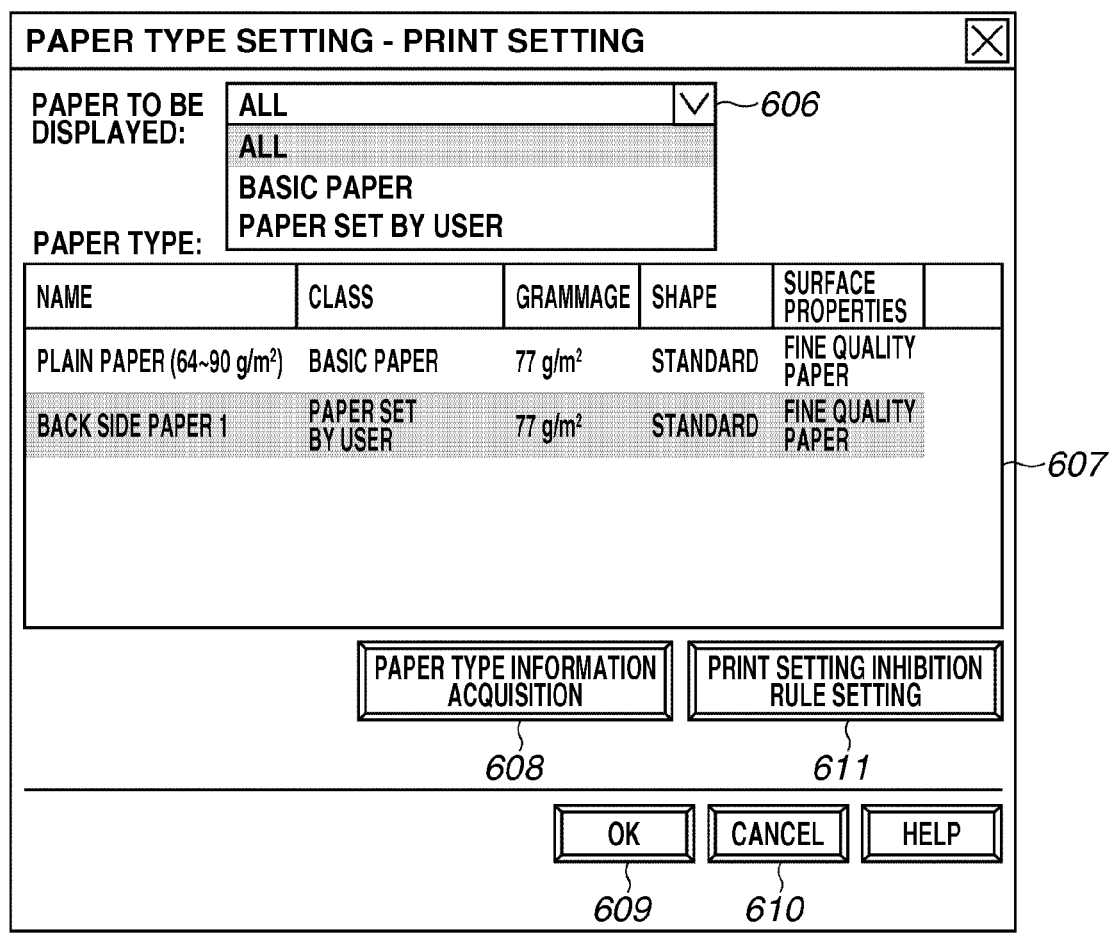

The paper type information display field 602 displays a paper type name selected by the print setting generation unit 204 in the currently performed print setting. If the paper type setting button 603 is clicked (pressed), the print setting generation unit 204 displays a paper type setting UI that enables the user to change the paper type selected in the currently performed print setting. FIG. 6B illustrates an example of the paper type setting UI. The illustrated content in FIG. 6B is described below in more detail.

If the OK button (i.e., a print setting completion button) 604 is clicked (pressed), the print setting generation unit 204 acquires the print setting input by the user and closes the print setting input UI. When the print setting completion button 604 is clicked, the print setting generation unit 204 determines that the print setting input operation by the user has been completed and the processing proceeds to step S511 of the flowchart illustrated in FIG. 5A.

If a cancel button 605 is clicked (pressed), the print setting generation unit 204 discards all of print setting contents and closes the print setting input UI. When the cancel button 605 is clicked, the print setting generation unit 204 determines that the user intends to delete the print setting contents having been input. Therefore, the print setting generation unit 204 terminates the processing routine of the flowcharts illustrated in FIGS. 5A and 5B without executing the processing in step S511.

FIG. 6B illustrates an example of the paper type setting UI that can be displayed when the paper type setting button 603 is clicked. The paper type setting UI illustrated in FIG. 6B displays paper type information acquired from the printer 150, which can be obtained by the paper type information management unit 209, to enable the user to select a paper type to be used in the currently performed generation print setting.

In FIG. 6B, a paper type display setting field 606 is a drop-down menu that enables users to select a display condition of the paper type to be displayed in a paper type information list display field 607.

The display condition according to the present exemplary embodiment is, for example, displaying only a basic paper initially registered for the printer 150, displaying only a user setting paper added later by the user, or displaying both paper types simultaneously. The paper type displayed in the paper type information list display field 607 can be updated according to the display condition selected by the user in the paper type display setting field 606.

The paper type information list display field 607 displays a list of paper types that satisfy the display condition designated in the paper type display setting field 606, which are part of the paper type information that the paper type information management unit 209 can acquire from the printer 150.

Further, the paper type information list display field 607 can accept selection of a paper type made by the user. According to the illustration of FIG. 6B, the displayed list includes "plain paper" and "back side paper 1", and the "back side paper 1" is in a selected state. In the present exemplary embodiment, items representing the paper type information include, for example, name, class, grammage, shape, and surface properties.

If a paper type information acquisition button 608 is clicked (pressed), the print setting generation unit 204 acquires paper type information from the printer 150 via the paper type information management unit 209 and updates the contents in the paper type information list display field 607.

If a print setting inhibition rule setting button 611 is clicked (pressed), the print setting generation unit 204 displays a UI that enables users to set print setting inhibition rules for the paper type currently selected. The processing to be performed when the print setting inhibition rule setting button 611 is clicked is described in more detail together with a description of print setting inhibition rule registration processing.

If a paper type setting completion button 609 is clicked (pressed), the print setting generation unit 204 updates the paper type information display field 602 of the print setting input UI so as to reflect the user selecting paper type in the paper type information list display field 607 and closes the paper type setting UI. When the paper type setting completion button 609 is clicked, the print setting generation unit 204 determines that the user has completed the paper setting input operation. Thus, the processing proceeds to step S505 of the flowchart illustrated in FIG. 5A.

If a cancel button 610 is clicked (pressed), the print setting generation unit 204 discards the contents of the paper type setting having been done, and closes the paper type setting UI. Then, the control by the print setting generation unit 204 returns to the print setting UI illustrated in FIG. 6A.

FIG. 7A illustrates an example of the print setting input UI to be displayed when the print setting generation unit 204 brings the two-sided print setting item into the non-display state in step S506 illustrated in FIG. 5A. The same reference numerals are used for portions that are similar to those illustrated in FIG. 6A.

In FIG. 7A, a printing method selection field 701 is a drop-down menu that enables users to select a desired printing method that is, for example, selectable among "one-sided printing", "two-sided printing", and "bookbinding printing." According to the illustration of FIG. 7A, only the two-sided printing item is grayed out and cannot be selected.

FIG. 7B illustrates an example of the print setting input UI to be displayed when the print setting generation unit 204 brings the two-sided saddle stitch bookbinding print setting item into the non-display state in step S507 illustrated in FIG. 5A. The same reference numerals are used for portions that are similar to those illustrated in FIG. 6A.

In FIG. 7B, a bookbinding method selection field 702 is a drop-down menu that enables users to select a desired bookbinding method that is, for example, selectable between "double-leaved bookbinding" and "two-sided saddle stitch bookbinding." According to the illustration of FIG. 7B, only the two-sided saddle stitch bookbinding item is grayed out and cannot be selected. The bookbinding method selection field 702 can be displayed only when the "bookbinding printing" is selected in the printing method selection field 701.

In the above-described exemplary embodiment, the print setting generation unit 204 applies the inhibition rule processing to the print setting input UI at the time when the selection of the paper type by the user is accomplished. However, it is also useful to apply the inhibition rule processing to the print setting input UI at the time when the selection of an arbitrary print setting item by the user is accomplished. For example, in a case where the user selects "test print" on the print setting input UI, it is desired to perform control to limit the usable paper type to the back side paper only.

Next, processing to be performed by the print setting inhibition rule management unit 207 of the printer driver 203 according to the present exemplary embodiment, which is performed for registration of print setting inhibition rules, is described below with reference to FIG. 8.

Figure 8:
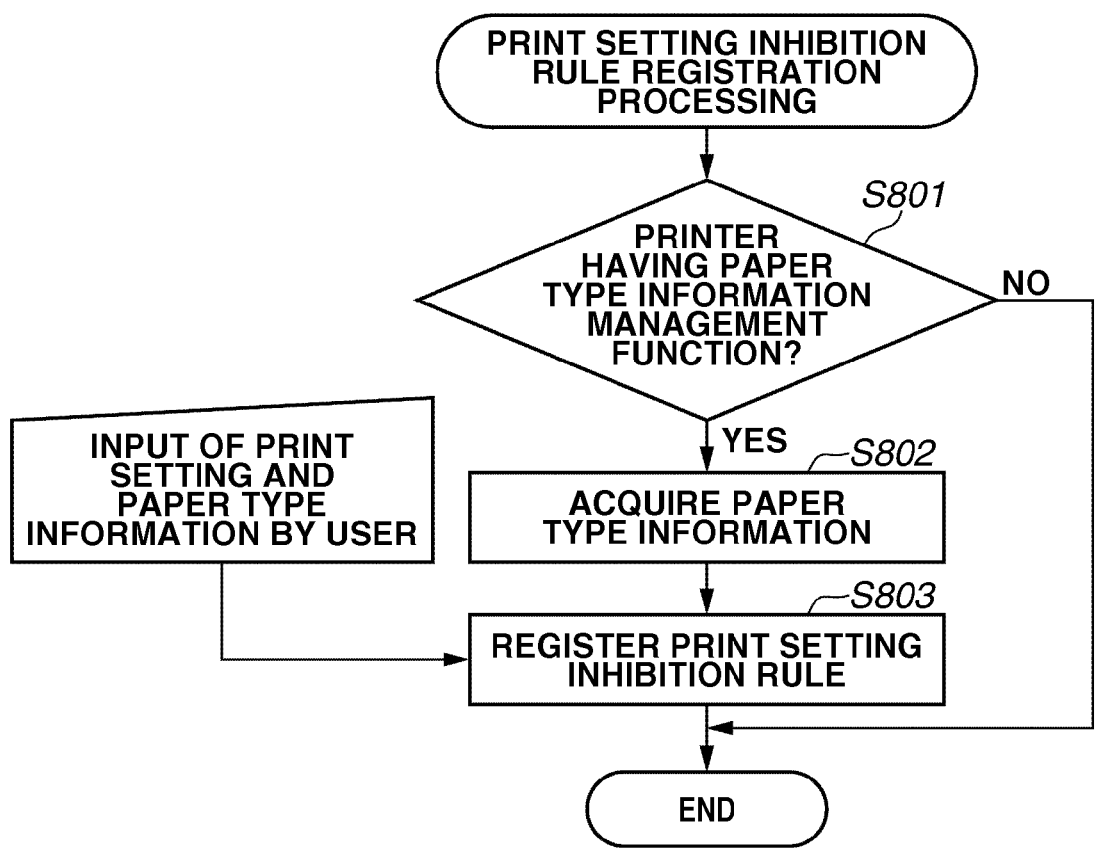
FIG. 8 is a flowchart illustrating an example of print setting inhibition rule information registration processing according to the first exemplary embodiment of the present invention.

FIG. 8 is a flowchart illustrating an example of the processing that can be performed by the print setting inhibition rule management unit 207 of the printer driver 203 according to the present exemplary embodiment, which is performed for registration of the print setting inhibition rules. The print setting inhibition rule management unit 207 executes the processing of the flowchart illustrated in FIG. 8. To this end, the CPU 101 loads a printer driver program recorded in the external memory 111 into the RAM 102 so that the OS can execute the loaded program.

If the user clicks (presses) the print setting inhibition rule setting button 611 on the print setting input UI of the printer driver 203 (see FIG. 6B), the print setting inhibition rule management unit 207 starts the processing of the flowchart illustrated in FIG. 8.

First, in step S801, the print setting inhibition rule management unit 207 determines whether the printer 150 has a paper type information management function, via the paper type information management unit 209. If it is determined that the printer 150 does not have any paper type information management function (NO in step S801), the print setting inhibition rule management unit 207 displays an error message on the print setting input UI and directly terminates the processing routine of the flowchart illustrated in FIG. 8.

On the other hand, if the print setting inhibition rule management unit 207 determines that the printer 150 has the paper type information management function (YES in step S801), the processing proceeds to step S802. In step S802, the print setting inhibition rule management unit 207 acquires paper type information from the printer 150 via the paper type information management unit 209. The print setting inhibition rule management unit 207 causes the display unit 110 to display a print setting inhibition rule setting UI, which enables users to input print setting inhibition rules. FIG. 9A illustrates an example of the print setting inhibition rule setting UI. The illustrated content in FIG. 9A is described below in more detail.

Then, if the print setting inhibition rule management unit 207 detects user's selection of any paper type and print setting on the print setting inhibition rule setting UI to be added as print setting inhibition rule, and addition of the selected print setting inhibition rule is instructed, the processing proceeds to step S803.

In step S803, the print setting inhibition rule management unit 207 registers a combination of the paper type selected by the user and the print setting, as a print setting inhibition rule, in the print setting inhibition rule management DB 208, and terminates the processing routine of the flowchart illustrated in FIG. 8.

FIGS. 9A and 9B illustrate examples of the print setting inhibition rule setting UI. FIG. 9A illustrates an example of the print setting inhibition rule setting UI that can be displayed by the print setting inhibition rule management unit 207 in step S802 of the flowchart illustrated in FIG. 8. In FIG. 9A, a print setting inhibition rule list display field 901 displays a list of print setting inhibition rules acquired by the paper type information management unit 209.

If a print setting inhibition rule addition button 902 is clicked (pressed), the print setting inhibition rule management unit 207 causes the display unit 110 to display a print setting inhibition rule addition UI. FIG. 9B illustrates an example of the print setting inhibition rule addition UI. The illustrated content in FIG. 9B is described below.

If a print setting inhibition rule deletion button 903 is clicked (pressed), the print setting inhibition rule management unit 207 deletes a registered print setting inhibition rule currently selected in the print setting inhibition rule list display field 901 from the print setting inhibition rule management DB 208.

If a cancel button 904 is clicked (pressed), the print setting inhibition rule management unit 207 terminates the print setting inhibition rule setting processing and closes the print setting inhibition rule setting UI without executing the processing in step S803 of the flowchart illustrated in FIG. 8.

FIG. 9B illustrates an example of the print setting inhibition rule addition UI that can be displayed by the print setting inhibition rule management unit 207 when the print setting inhibition rule addition button 902 illustrated in FIG. 9A is clicked.

In FIG. 9B, a paper type selection field 905 displays a list of paper type information acquired from the printer 150, which enables the user to select a desired paper type. A print setting selection filed 906 displays a list of print settings that are selectable as print setting inhibition rules, which enables the user to select a desired print setting.

If a print setting inhibition rule addition button 907 is clicked (pressed), the print setting inhibition rule management unit 207 starts the processing in step S803 in the flowchart illustrated in FIG. 8. Then, in step S803 illustrated in FIG. 8, the print setting inhibition rule management unit 207 registers a combination of the paper type selected in the paper type selection field 905 and the print setting selected in the print setting selection filed 906, as a print setting inhibition rule.

If a cancel button 908 is clicked (pressed), the print setting inhibition rule management unit 207 terminates the print setting inhibition rule processing and closes the print setting inhibition rule addition UI. Then, the control by the print setting inhibition rule management unit 207 returns to the print setting inhibition rule setting UI illustrated in FIG. 9A.

Through the above-described procedure, the present exemplary embodiment can manage the print setting inhibition rules that may induce a print failure (e.g., two-sided printing and two-sided saddle stitch bookbinding printing) although print setting on a backside paper is physically feasible. The present exemplary embodiment can reflect a management result to a print setting generation UI so as to prevent any print failure.

The printing system described in the present exemplary embodiment is configured to control the print setting inhibition rules when the back side paper is designated. On the other hand, it is also useful to perform control to prevent the back side paper from being designated in a case where a designated print setting is a print setting that may cause a print failure (e.g., two-sided printing and two-sided saddle stitch bookbinding printing) although print setting on a back side paper is physically feasible.

In this case, it is useful to generate a message to allow users to cancel the designation of the two-sided printing or the two-sided saddle stitch bookbinding printing or cancel the designation of the back side paper.

In the first exemplary embodiment, to prevent any print failure that may occur in print processing using back side paper, the host computer 100 manages print setting inhibition rules and reflects the managed print setting inhibition rules to the UI of the printer driver 203. However, in a case where the printer driver 203 does not have any function for managing these print setting inhibition rules and does not have any function for reflecting the managed print setting inhibition rules to the UI, the printer 150 can perform processing corresponding to the above-described functions.

Hence, the present exemplary embodiment provides an example of the printing system that includes the printer 150 capable of managing print setting inhibition rules and reflecting the managed print setting inhibition rules to print processing.

The printing system according to the present exemplary embodiment has a system configuration and a hardware configuration similar to those of the printing system according to the first exemplary embodiment illustrated in FIG. 1, and the description thereof is not repeated.

Figure 10:
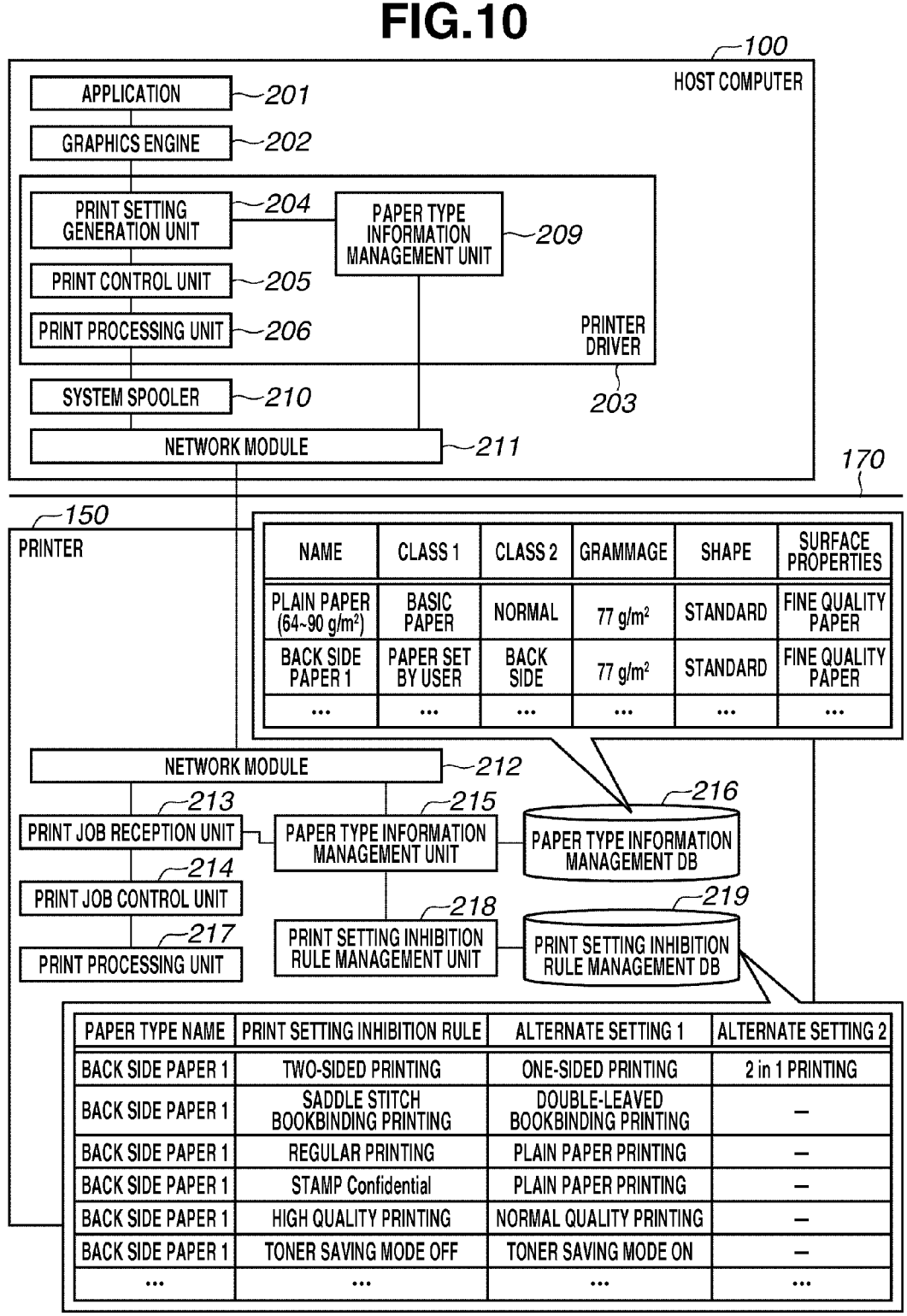
FIG. 10 is a block diagram illustrating an application configuration of a printing system according to a second exemplary embodiment of the present invention.

FIG. 10 is a block diagram illustrating an application configuration of the printing system according to a second exemplary embodiment. Functional units 201 to 217 illustrated in FIG. 10 are similar to those described in the first exemplary embodiment (refer to FIG. 2), and, therefore, the description thereof is not repeated.

A print setting inhibition rule management unit 218 can manage a print setting inhibition rule management DB 219 that stores the paper type information managed by the paper type information management unit 215 together with the print setting inhibition rule, while associating them with each other.

The print setting inhibition rule management unit 218 is a functional unit that can be realized by the CPU 101 that executes a program loaded from the ROM 154. Further, the print setting inhibition rule management DB 219 can be realized as a storage area of the external memory 160.

The print setting inhibition rule information stored in the print setting inhibition rule management DB 219 is similar to the print setting inhibition rule information stored in the print setting inhibition rule management DB 208 described in the first exemplary embodiment.

To prevent any failure that may occur in print processing using back side paper, it is useful to store beforehand a print setting to be designated as an inhibition rule when print processing using the back side paper is performed, in the print setting inhibition rule management DB 219, in association with paper type information relating to the back side paper.

For example, the failure that may occur in print processing using a back side paper can be effectively prevented by registering beforehand a print setting including a process of performing printing on the front and back surfaces of paper (e.g., two-sided print setting or two-sided saddle stitch bookbinding setting), as print setting inhibition rule information, in association with the back side paper.

The print setting inhibition rule management DB 219 can store print setting inhibition rules received from the print setting inhibition rule management unit 218. A typical configuration of print processing that can be performed by the host computer 100 is similar to that described in the first exemplary embodiment (see FIG. 3), and, therefore, the description thereof is not repeated.

Next, print processing that can be performed by the printer 150 is described below with reference to FIG. 11. FIG. 11 is a flowchart illustrating an example of the print processing that can be performed by the printer 150. A program relating to the flowchart illustrated in FIG. 11 is stored in the HD 160 of the printer 150. The CPU 152 executes the program loaded into the RAM 153 from the HD 160.

In step S1001, the print job reception unit 213 receives a PDL command (i.e., a job) from the system spooler 210 illustrated in FIG. 3 and sends the received job to the print job control unit 214.

Next, in step S1002, the print job control unit 214 determines whether a paper setting designated by the received print job is the back side paper (i.e., performs paper type determination processing). In this case, if the paper setting of the print job includes designation of a paper feeding unit or a paper size, it is useful to determine whether the designated paper setting is the back side paper by acquiring information that associates the paper feeding unit or the paper size with the paper type from the paper type information management unit 215.

If the print job control unit 214 determines that the paper setting designated by the received print job is not the back side paper (NO in step S1002), the processing proceeds to step S1010. In step S1010, the print processing unit 217 acquires the print job from the print job control unit 214 and performs printing of document data.

On the other hand, if the print job control unit 214 determines that the paper setting designated by the received print job is the back side paper (YES in step S1002), the processing proceeds to step S1003.

In step S1003, the print job control unit 214 determines whether the print setting designated by the print job is two-sided printing. If the print job control unit 214 determines that the print setting designated by the print job is the two-sided printing (YES in step S1003), the processing proceeds to step S1004.

In step S1004, the print job control unit 214 changes the print setting of the print job to the "one-sided printing" (i.e., an alternate setting) to prevent any failure that may occur when the two-sided printing is performed on a back side paper. Then, the processing proceeds to step S1005.

On the other hand, if the print job control unit 214 determines that the print setting designated by the print job is not the two-sided printing (NO in step S1003), the processing directly proceeds to step S1005. Next, in step S1005, the print job control unit 214 determines whether the print setting designated by the print job is two-sided saddle stitch bookbinding printing. If the print job control unit 214 determines that the print setting designated by the print job is the two-sided saddle stitch bookbinding printing (YES in step S1005), the processing proceeds to step S1006.

In step S1006, the print job control unit 214 changes the print setting of the print job to the "double-leaved bookbinding printing" (i.e., an alternate setting) to prevent any failure that may occur when the two-sided saddle stitch bookbinding printing is performed on a back side paper. Then, the processing proceeds to step S1007.

On the other hand, if the print job control unit 214 determines that the print setting designated by the print job is not the two-sided saddle stitch bookbinding printing (NO in step S1005), the processing directly proceeds to step S1007. Subsequently, in steps S1007 to S1009, the print setting generation unit 204 executes processing for applying the print setting inhibition rules corresponding to the print setting inhibition rules registered in the print setting inhibition rule management DB 219 to the UI. The print setting inhibition rules applied in this case correspond to inhibition rules other than the general inhibition rules applied to the back side paper (e.g., two-sided printing, two-sided saddle stitch bookbinding printing, etc.).

First, in step S1007, the print job control unit 214 successively controls all print setting inhibition rules registered in the print setting inhibition rule management DB 219 as a processing object to be subjected to the processing in steps S1008 and S1009.

In step S1008, the print job control unit 214 determines whether the print setting inhibition rule of the present processing object is a print setting inhibition rule associated with the paper setting designated by the print job (i.e., performs print setting inhibition rule determination processing).

Then, if the print job control unit 214 determines that the print setting inhibition rule of the present processing object is the print setting inhibition rule associated with the paper setting designated by the print job (YES in step S1008), the processing proceeds to step S1009.

In step S1009, the print job control unit 214 applies the print setting inhibition rule to the print job. As an example of the method for applying the print setting inhibition rules to the print job, it is useful to cancel the print job if the print setting is included in the inhibition rules. If there is any alternate setting of the print setting inhibition rule registered beforehand, it is also useful to replace the print job setting with an alternate setting. It is also useful to display a warning on the UI of the printer driver 203 of the host computer 100 to allow the user to confirm the situation and select an alternate setting.

After completing the processing in step S1009, or if it is determined that the print setting inhibition rule of the present processing object is not the print setting inhibition rule associated with the paper setting designated by the print job (NO in step S1008), the print job control unit 214 determines whether the processing in steps S1008 to S1009 has been executed for all of the above-described print setting inhibition rules. If there is at least one print setting inhibition rule that is not yet subjected to the above-described processing in steps S1008 to S1009, the print job control unit 214 repeats the above-described processing in steps S1008 to S1009 for the next print setting inhibition rule of a new processing object.

On the other hand, if the print job control unit 214 determines that the processing in steps S1008 to S1009 has been executed for all of the above-described print setting inhibition rules, the processing proceeds to the final step S1010. In step S1010, the print processing unit 217 acquires the print job from the print job control unit 214 and performs printing of the document data.

According to the example processing illustrated in FIG. 11, specific inhibition rules other than the general inhibition rules are registered beforehand in the print setting inhibition rule management DB 219 and the print job control unit 214 separately performs the processing in steps S1003 to S1006 to be applied to the general inhibition rules and the processing in steps S1007 to S1009 to be applied to the specific inhibition rules.

However, it is also useful that all inhibition rules including the general inhibition rules are registered beforehand in the print setting inhibition rule management DB 219 and the print job control unit 214 performs the processing in steps S1007 to S1009 for each inhibition rule stored in the print setting inhibition rule management DB 219. In this case, the print job control unit 214 can skip the above-described processing in steps S1003 to S1006.

In the present exemplary embodiment, in a case where the user registers a print setting inhibition rule for the printer 150, the user can input a print setting inhibition rule to be registered using the paper type setting UI and the print setting inhibition rule addition UI displayed on the operation unit 159 of the printer 150.

If the user inputs a print setting inhibition rule via the paper type setting UI, the print setting inhibition rule management unit 218 acquires the information input by the user and registers the acquired information as a print setting inhibition rule. FIG. 12A illustrates an example of the paper type setting UI. FIG. 12B illustrates an example of the print setting inhibition rule addition UI.

FIGS. 12A and 12B illustrate examples of the UI that can be displayed on the operation unit 159 of the printer 150. FIG. 12A illustrates an example of the paper type setting UI that can be displayed on the operation unit 159 of the printer 150.

In FIG. 12A, a paper type display setting field 1101 is a drop-down menu that enables users to select a display condition of the paper type to be displayed in a paper type information list display field 1102. The display condition according to the present exemplary embodiment is, for example, displaying only a basic paper initially registered for the printer 150, displaying only a user setting paper added later by the user, or displaying both paper types simultaneously. The paper type displayed in the paper type information list display field 1102 can be updated according to the display condition selected by the user in the paper type display setting field 1101.

The paper type information list display field 1102 displays a list of paper type that satisfy the display condition designated in the paper type display setting field 1101, which is part of the paper type information registered in the paper type information management unit 215. Further, the paper type information list display field 1102 can accept selection of a paper type made by the user.

The paper type information list display field 1102 enables the user to select a desired paper type from the displayed paper type information list using a touch panel or a hard key of the operation unit 159. According to the illustration of FIG. 12A, the displayed list includes "thick paper" and "back side paper 1", and the "back side paper 1" is in a selected state. In the present exemplary embodiment, "name" and "grammage" are displayed as items representing the paper type information although other items (e.g., class, shape, and surface properties) can be also displayed.

If a paper type editing button 1103 is touched (pressed), the paper type information management unit 215 displays an UI that displays detailed information (e.g., name, class, grammage, shape, and surface properties) of the paper type currently selected in the paper type information list display field 1102, to enable the user to edit the paper type information.

If a paper type duplication button 1104 is touched (pressed), the paper type information management unit 215 duplicates the paper type having setting contents similar to those of the paper type currently selected in the paper type information list display field 1102.

If a paper type deletion button 1105 is touched (pressed), the paper type information management unit 215 deletes the paper type currently selected in the paper type information list display field 1102 from the paper type information management DB 216.

If a print setting inhibition rule setting button 1106 is touched (pressed), the print setting inhibition rule management unit 218 displays a print setting inhibition rule addition UI that enables the user to register a print setting inhibition rule relating to the paper type currently selected in the paper type information list display field 1102. FIG. 12B illustrates an example of the print setting inhibition rule addition UI. The illustrated content in FIG. 12B is described below in more detail.

If a cancel button 1107 is touched (pressed), the paper type information management unit 215 completes the paper type setting operation and closes the paper type setting UI. FIG. 12B illustrates an example of the print setting inhibition rule addition UI that can be displayed by the print setting inhibition rule management unit 218 when the print setting inhibition rule setting button 1106 illustrated in FIG. 12A is clicked.

In FIG. 12B, a currently selected paper type display field 1108 displays a name of the paper type currently selected on the paper type setting UI illustrated in FIG. 12A. A print setting selection filed 1109 displays a list of print settings that are selectable as a print setting inhibition rule to accept selection of a print setting made by the user.

If a print setting inhibition rule registration button 1110 is touched (pressed), the print setting inhibition rule management unit 218 registers a combination of the paper type currently selected in the paper type information list display field 1102 and the print setting selected in the print setting selection filed 1109, as a print setting inhibition rule, in the print setting inhibition rule management DB 219.

If a cancel button 1111 is touched (pressed), the print setting inhibition rule management unit 218 terminates the print setting inhibition rule addition processing and closes the print setting inhibition rule addition UI. Then, the control by the print setting inhibition rule management unit 218 returns to the paper type setting UI illustrated in FIG. 12A.

Through the above-described procedure, the printer 150 can manage print setting inhibition rules and reflect the managed print setting inhibition rule to the print processing, even in a case where the printer driver 203 does not have any function for managing the print setting inhibition rules and does not have any function for reflecting the managed print setting inhibition rules to the UI. Thus, the present exemplary embodiment can prevent any print failure that may occur in print processing performed on the back side paper.

In the above-described first and second exemplary embodiments, the printer 150 has a paper type information management function. However, if the printer 150 does not have any function for managing the paper type information, a dedicated server can manage the paper type information of the printer 150. Further, if the printer 150 does not have any function for managing the print setting inhibition rules, the dedicated server can manage the print setting inhibition rules. Hence, a printing system according to the present exemplary embodiment includes a dedicated server that can manage the paper type information of the printer 150 and the print setting inhibition rules applied to the printer 150.

Figure 13:
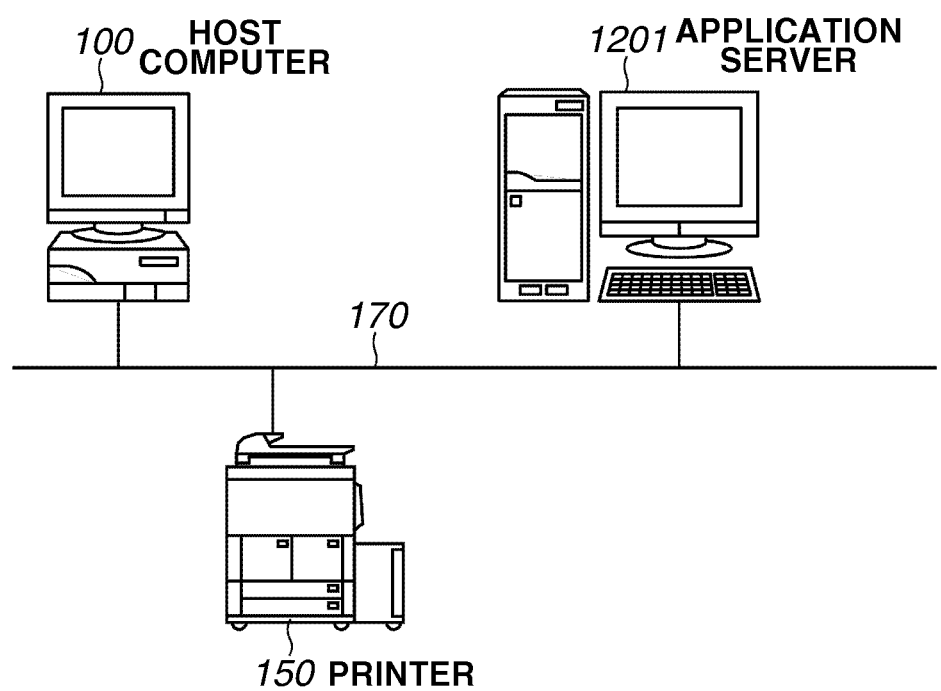
FIG. 13 is a block diagram illustrating an example system configuration of a printing system according to a third exemplary embodiment of the present invention.

FIG. 13 is a block diagram illustrating an example system configuration of the printing system according to a third exemplary embodiment of the present invention. As illustrated in FIG. 13, the printing system according to the third exemplary embodiment includes a host computer 100, a printer 150, and an application server 1201, which are mutually connected via the network 170.

The host computer 100 and the printer 150 are similar to those of the first exemplary embodiment illustrated in FIG. 1 in the hardware configuration and, therefore, the description thereof is not repeated. Further, the application server 1201 has a hardware configuration of a general computer, which is similar to that of the host computer 100 according to the first exemplary embodiment illustrated in FIG. 1. Therefore, the hardware configuration of the application server 1201 is not described below.

Figure 14:
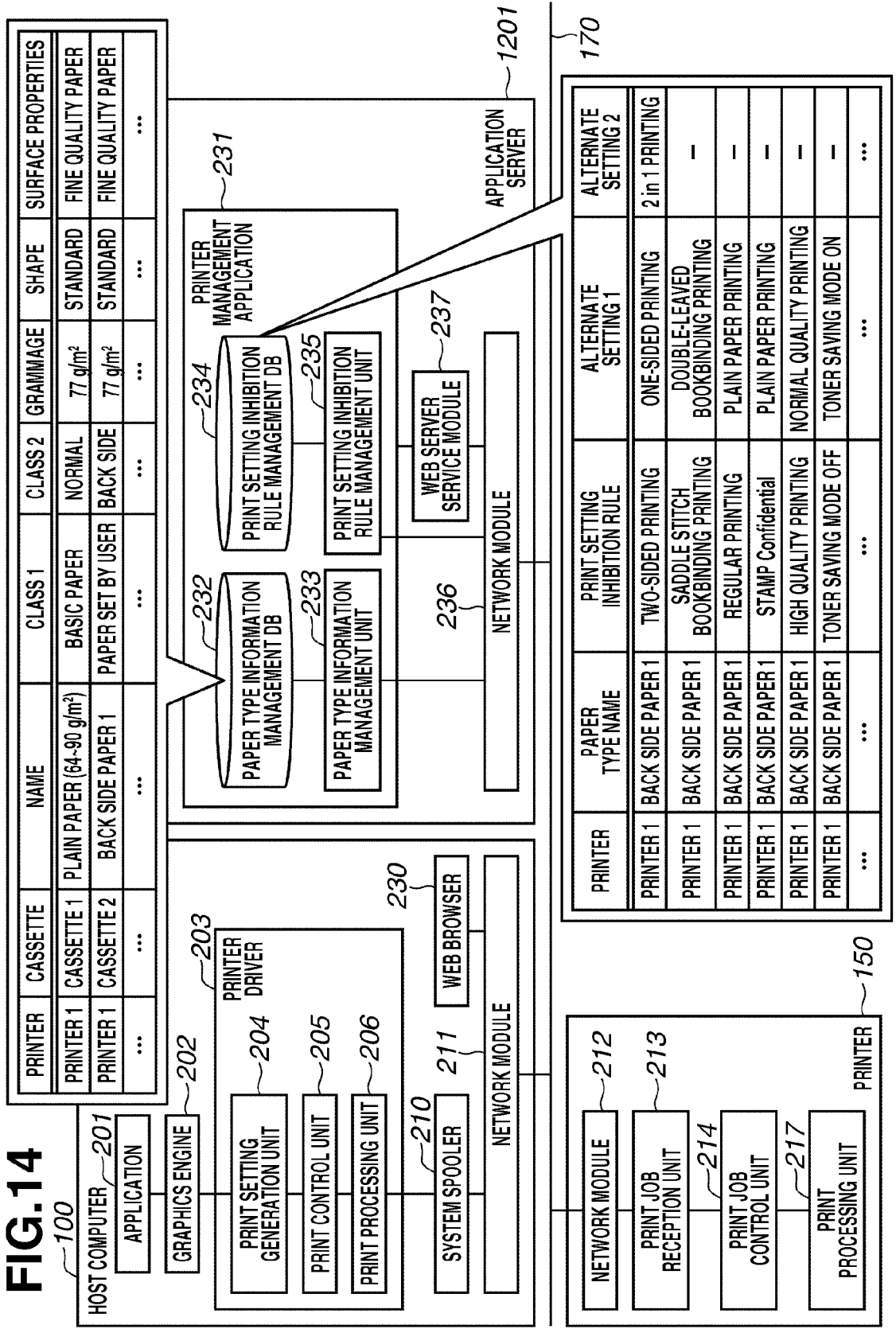
FIG. 14 is a block diagram illustrating an application configuration of the printing system according to the third exemplary embodiment of the present invention.

FIG. 14 is a block diagram illustrating an application configuration of the printing system according to the third exemplary embodiment. Functional units 201 to 211 of the host computer 100 and functional units 212 to 217 of the printer 150 are similar to those of the first exemplary embodiment illustrated in FIG. 2, and, therefore, the description thereof is not repeated.

The present exemplary embodiment is different from the first and second exemplary embodiments in that the host computer 100 and the printer 150 do not have any function for managing the paper type and print setting inhibition rules. However, similar to the first and second exemplary embodiments, either the host computer 100 or the printer 150 may have the function for managing the paper type and print setting inhibition rules.

The host computer 100 includes a web browser 230. The host computer 100 can access the application server 1201 via the web browser 230. The web browser 230 can be present as a file stored in the ROM 103 or the external memory 111. The web browser 230 is a program module to be loaded into the RAM 102, when executed, by the OS or a module that uses the module. To realize the function of the web browser 230, the CPU 101 of the host computer 100 executes the program module.

The web browser 230 transmits an HTTP request message to the application server 1201 via the network module 211.

The web browser 230 receives an HTTP response message from the application server 1201 and displays the HTTP response message.

The application server 1201 includes a printer management application 231, a network module 236, and a web server service module 237, which are present as files stored in the ROM 103 or the external memory 111 and serve as program modules loaded into the RAM 102, when executed, by the OS or a module that uses the module. To realize the functions of the printer management application 231, the network module 236, and the web server service module 237, the CPU 101 of the application server 1201 executes these program modules.

Further, the printer management application 231 can be added to an FD or a CD-ROM, which serves as the external memory 111, or via the network to an HD serving as the external memory 111.

The printer management application 231 can acquire information of the printer 150 via the network and manage the acquired printer information. The printer management application 231 includes a paper type information management DB 232, a paper type information management unit 233, a print setting inhibition rule management DB 234, and a print setting inhibition rule management unit 235.

The paper type information management DB 232 stores the paper type information of the printer 150 that can be managed by the printer management application 231. The information to be registered as the paper type information includes, for example, items of paper type name, class, grammage, shape, and surface properties. The paper type information may further include information that is usable to determine whether the paper type is back side paper.

The paper type information management unit 233 performs paper type information storage and management processing. To this end, the paper type information management unit 233 performs processing for registering and acquiring paper type information to and from the paper type information management DB 232.

The print setting inhibition rule management DB 234 stores the paper type information managed by the paper type information management DB 232, as a print setting inhibition rule, in association with a print setting that is set as an inhibition rule when the printer driver 203 of the host computer 100 performs the print setting generation. The print setting inhibition rule information stored in the print setting inhibition rule management DB 234 is similar to the print setting inhibition rule information stored in the print setting inhibition rule management DB 208 described in the first exemplary embodiment.

To prevent any failure that may occur in print processing using back side paper, it is useful to store beforehand a print setting to be designated as an inhibition rule when print processing using the back side paper is performed, in the print setting inhibition rule management DB 234, in association with paper type information relating to the back side paper.

For example, the failure that may occur in print processing using a back side paper can be prevented by registering beforehand a print setting including a process of performing printing on the front and back surfaces of paper (e.g., two-sided print setting or two-sided saddle stitch bookbinding setting) as print setting inhibition rule information in association with the back side paper.

The print setting inhibition rule management unit 235 performs print setting inhibition rule storage and management processing. To this end, the print setting inhibition rule management unit 235 registers and acquires print setting inhibition rules to and from the print setting inhibition rule management DB 234.

The paper type information management DB 232 and the print setting inhibition rule management DB 234 can be realized as a storage area of the external memory 111 of the application server 1201.

The network module 236 performs network communications with the host computer 100 and the printer 150 using arbitrary communication protocols. If the web server service module 237 receives an HTTP request from the web browser 230 of the host computer 100, the web server service module 237 returns an HTTP response. For example, as an example of the HTTP response, the web server service module 237 returns web page data stored in the external memory 111.

The printer management application 231 is installable as a program that can execute predetermined processing, for example, in response to a web page request that can be provided by the web server service module 237. As described above, the printer management application 231 and the web server service module 237 can cooperatively realize a web application capable of managing the printer 150.

A typical configuration of print processing that can be performed by the host computer 100 is similar to that described in the first exemplary embodiment (see FIG. 3), and, therefore, the description thereof is not repeated. Further, print processing to be performed by the printer driver 203 in the above-described print processing is similar to that described in the first exemplary embodiment (see FIG. 4), and, therefore, the description thereof is not repeated.

Hereinafter, the print setting generation processing (i.e., the processing performed in step S402) that can be performed by the printer driver 203 according to the present exemplary embodiment is described below with reference to the flowchart illustrated in FIG. 15. FIG. 15 is a flowchart illustrating details of the print setting generation processing (see step S402) that can be performed by the printer driver 203 according to the third exemplary embodiment.

Processing to be performed in steps S501 to S511 is similar to that of the first exemplary embodiment described in FIG. 5A, and, therefore, the description thereof is not repeated. In step S501, if the print setting generation unit 204 determines that the printer 150 does not have any paper type information management function (NO in step S501), the processing proceeds to step S520.

In step S520, the print setting generation unit 204 acquires paper type information from the paper type information management unit 233 of the printer management application 231, which is operating on the application server 1201, via the network module 211.

Then, in step S521, the print setting generation unit 204 acquires print setting inhibition rules from the print setting inhibition rule management unit 235 of the printer management application 231, which is operating on the application server 1201, via the network module 211 (performs print setting inhibition rule acquisition processing). Then, the processing proceeds to step S504.

As described above, in a case where the printer 150 does not have any paper type information management function, the print setting generation unit 204 acquires the paper type information from the application server 1201 (not from the printer 150). Further, the print setting generation unit 204 acquires the print setting inhibition rules from the application server 1201 (not from the print setting inhibition rule management DB 208 of the printer driver).

Further, if a request is received from the print setting generation unit 204 of the printer driver 203, the application server 1201 can transmit the paper type information and the print setting inhibition rules to the print setting generation unit 204.

In the present exemplary embodiment, the host computer 100 performs processing for registering paper type information and print setting inhibition rules to the printer management application 231 via the web browser 230. FIG. 16 illustrates an example of a paper type information registration UI that can be displayed on the web browser 230. FIG. 17 illustrates an example of a print setting inhibition rule registration UI. The illustrated contents of FIGS. 16 and 17 are described below in more detail.

If the web server service module 237 of the application server 1201 receives a paper type information registration request from the web browser 230 of the host computer 100, the web server service module 237 performs requested paper type registration processing.

In the paper type registration processing, the web server service module 237 registers paper type information to the paper type information management DB 232 via the paper type information management unit 233.

On the other hand, if the web server service module 237 of the application server 1201 receives a print setting inhibition rule registration request from the web browser 230, the web server service module 237 performs print setting inhibition rule registration processing.

In the print setting inhibition rule registration processing, the web server service module 237 registers print setting inhibition rules to the print setting inhibition rule management DB 234 via the print setting inhibition rule management unit 235. FIG. 16 illustrates an example of the paper type information registration UI that can be displayed when the web browser 230 of the host computer 100 accesses the printer management application 231.

In FIG. 16, a paper type information list display field 1301 displays a list of paper type information relating to the printer 150 that is registered in the paper type information management DB 232. The paper type information to be displayed includes, for example, items of paper type name, class, grammage, shape, and surface properties. Further, the paper type information list display field 1301 can be used to perform editing of the paper type information registered in the paper type information management DB 232.

If a duplication button 1302 is clicked (pressed), a duplication notification is sent to the printer management application 231 via the web browser 230 and the web server service module 237. Then, the paper type information management unit 233 of the printer management application 231 duplicates the paper type information currently selected in the paper type information list display field 1301 and registers the duplicated paper type information in the paper type information management DB 232. The duplicated paper type information is also displayed in the paper type information list display field 1301.

If a deletion button 1303 is clicked (pressed), a deletion notification is sent to the printer management application 231 via the web browser 230 and the web server service module 237. Then, the paper type information management unit 233 of the printer management application 231 deletes the paper type information currently selected in the paper type information list display field 1301 from the paper type information management DB 232.

A paper type setting entry field 1304 is a user interface that enables users to input a paper type setting to be added. The setting that can be input in this case includes, for example, items of paper type name, class, grammage, shape, and surface properties.

If a registration button 1305 is clicked (pressed), a registration notification is sent to the printer management application 231 via the web browser 230 and the web server service module 237. Then, the paper type information management unit 233 of the printer management application 231 registers paper type information to the paper type information management DB 232 based on user's settings input in the paper type setting entry field 1304. The registered paper type information is displayed in the paper type information list display field 1301.

FIG. 17 illustrates an example of the print setting inhibition rule registration UI that can be displayed when the web browser 230 of the host computer 100 accesses the printer management application 231.

In FIG. 17, a print setting inhibition rule list display field 1310 displays a list of print setting inhibition rules relating to the printer 150, which are registered in the print setting inhibition rule management DB 234. The displayed print setting inhibition rules include, for example, items of paper type name, grammage, and name of inhibited print setting.

If a deletion button 1311 is clicked (pressed), a deletion notification is sent to the printer management application 231 via the web browser 230 and the web server service module 237. Then, the print setting inhibition rule management unit 235 of the printer management application 231 deletes a print setting inhibition rule currently selected in the print setting inhibition rule list display field 1310 from the print setting inhibition rule management DB 234.

A print setting inhibition rule entry field 1312 is a user interface that enables users to select a setting for a print setting inhibition rule to be added. The print setting inhibition rule entry field 1312 includes a paper type selection field 1313 and a print setting selection field 1314.

The paper type selection field 1313 is a drop-down menu that displays a list of paper type information registered in the paper type information management DB 232 to allow a user to select paper type information as a target to which the print setting inhibition rule is applied. The print setting selection filed 1314 is a drop-down menu that displays a list of print settings selectable as a print setting inhibition rule to allow a user to select a print setting as a target to which the print setting inhibition rule is applied.

If a registration button 1315 is clicked (pressed), a registration notification is sent to the printer management application 231 via the web browser 230 and the web server service module 237. Then, the print setting inhibition rule management unit 235 of the printer management application 231 registers a print setting inhibition rule to the print setting inhibition rule management DB 234 based on a setting currently selected in the print setting inhibition rule entry field 1312. The registered print setting inhibition rule is displayed in the print setting inhibition rule list display field 1310.

As described in the present exemplary embodiment, if the host computer 100 and the printer 150 do not have any function for managing the paper type information of the printer 150 and the print setting inhibition rules applied to the printer 150, the dedicated server can manage the paper type information of the printer 150 and the print setting inhibition rules applied to the printer 150.

Through the above-described procedure, even in a case where the host computer 100 and the printer 150 do not have any function for managing the paper type information of the printer 150 and the print setting inhibition rules applied to the printer 150, the UI of the printer driver 203 can prevent any print failure that may occur in print processing performed on a back side paper.

In the present exemplary embodiment, in a case where the printer 150 does not have any paper type information management function, the application server 1201 can provide paper type information and print setting inhibition rules. However, in such a case, it is also useful to acquire paper type information from the application server 1201 and acquire print setting inhibition rules from the print setting inhibition rule management DB 208 of the printer driver 203.

The configuration and contents of the above-described various data can be modified in various ways according to the usage and purpose thereof. The present invention is not limited to the above-described exemplary embodiments and can be applied to a system, an apparatus, a method, a program or a storage medium. For example, the present invention can be applied to a system including a plurality of devices or can be applied to an apparatus configured as a single device.

The above-described first to third exemplary embodiments can be combined so as to form a printing system according to an exemplary embodiment of the present invention. The exemplary embodiments of the present invention can effectively prevent any failure in the print processing using a back side paper.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-184182 filed Aug. 7, 2009, which is hereby incorporated by reference herein in its entirety.

What is claimed is:

1. An information processing apparatus including a user interface that is operable to designate a print setting for a print job to be printed by a printing apparatus, the information processing apparatus comprising:
   a paper type information acquisition unit configured to acquire paper type information from the printing apparatus, as information indicating paper stored in the printing apparatus, wherein the paper type information includes information usable to determine whether an acquired paper type is one-sided printed paper that has a printed surface on which printing is already performed and an unprinted surface to be used for printing;
   a print setting inhibition rule management unit configured to store and manage a print setting to be designated as an inhibition rule when printing using the one-sided printed paper is performed, as print setting inhibition rule information, in association with the paper type information usable to identify the one-sided printed paper;
   a paper type determination unit configured to determine whether a paper setting included in the print setting designated by the user interface is a setting corresponding to the paper type information usable to identify the one-sided printed paper based on the paper type information acquired by the paper type information acquisition unit;
   a print setting inhibition rule determination unit configured to determine whether print setting inhibition rule information associated with the paper type information corresponding to the designated paper setting is stored and managed by the print setting inhibition rule management unit, if the paper type determination unit determines that the designated paper setting is the setting corresponding to the paper type information usable to identify the one-sided printed paper; and
   a control unit configured to perform control to prevent the print setting designated as an inhibition rule in the print setting inhibition rule information from being designated by the user interface, if the print setting inhibition rule determination unit determines that the print setting inhibition rule information associated with the paper type information corresponding to the designated paper setting is stored and managed by the print setting inhibition rule management unit,
   wherein the print setting inhibition rule information includes an alternate setting of the setting to be designated as the inhibition rule, and
   wherein the control unit is configured to control the user interface to change a print setting corresponding to the print setting inhibition rule information associated with the paper type information corresponding to the designated paper setting to the alternate setting of the print setting.

2. The information processing apparatus according to claim 1, further comprising:
   a determination unit configured to determine whether the printing apparatus has a function for storing and managing the paper type information; and
   an acquisition unit configured to acquire the paper type information from an external management apparatus if the determination unit determines that the printing apparatus does not have the function for storing and managing the paper type information.

3. The information processing apparatus according to claim 2, wherein the acquisition unit is configured to further acquire the print setting inhibition rule information from the management apparatus if the determination unit determines that the printing apparatus does not have the function for storing and managing the paper type information.

4. The information processing apparatus according to claim 1, wherein the print setting to be designated as the inhibition rule when printing using the one-sided printed paper is performed includes a process of performing printing on both surfaces of paper.

5. The information processing apparatus according to claim 1, wherein the user interface is provided by a printer driver corresponding to the printing apparatus.

6. An information processing apparatus including a user interface that is operable to designate a print setting for a print job to be printed by a printing apparatus, the information processing apparatus comprising:
   a paper type information acquisition unit configured to acquire paper type information from an external management apparatus, as information indicating paper stored in the printing apparatus, wherein the paper type information includes information usable to determine whether an acquired paper type is one-sided printed paper that has a printed surface on which printing is already performed and an unprinted surface to be used for printing;

a print setting inhibition rule acquisition unit configured to acquire, from the management apparatus, print setting inhibition rule information that associates a print setting to be designated as an inhibition rule when printing using the one-sided printed paper is performed with the paper type information usable to identify the one-sided printed paper;

a paper type determination unit configured to determine whether a paper setting included in the print setting designated by the user interface is a setting corresponding to the paper type information usable to identify the one-sided printed paper based on the paper type information acquired by the paper type information acquisition unit;

a print setting inhibition rule determination unit configured to determine whether print setting inhibition rule information associated with the paper type information corresponding to the designated paper setting is included in the print setting inhibition rule information acquired by the print setting inhibition rule acquisition unit, if the paper type determination unit determines that the designated paper setting is the setting corresponding to the paper type information usable to identify the one-sided printed paper; and a control unit configured to perform control to prevent the print setting designated as an inhibition rule in the print setting inhibition rule information from being designated by the user interface, if the print setting inhibition rule determination unit determines that the print setting inhibition rule information associated with the paper type information corresponding to the designated paper setting is included in the print setting inhibition rule information acquired by the print setting inhibition rule acquisition unit, wherein the print setting inhibition rule information includes an alternate setting of the setting to be designated as the inhibition rule, and wherein the control unit is configured to control the user interface to change a print setting corresponding to the print setting inhibition rule information associated with the paper type information corresponding to the designated paper setting to the alternate setting of the print setting.

7. The information processing apparatus according to claim 6, wherein the print setting to be designated as an inhibition rule when printing using the one-sided printed paper is performed is a print setting including a process of performing printing on both surfaces of paper.

8. The information processing apparatus according to claim 6, wherein the user interface is provided by a printer driver corresponding to the printing apparatus.

9. A printing apparatus configured to perform printing based on a print setting received from an information processing apparatus, the printing apparatus comprising:

a paper type information management unit configured to store and manage paper type information as information indicating paper stored in the printing apparatus, wherein the paper type information includes information usable to determine whether an acquired paper type is a one-sided printed paper that has a printed surface on which printing is already performed and an unprinted surface to be used for printing;

a print setting inhibition rule management unit configured to store and manage a print setting to be designated as an inhibition rule when printing using the one-sided printed paper is performed and an alternate setting of the print setting to be designated as the inhibition rule, as print setting inhibition rule information, in association with the paper type information usable to identify the one-sided printed paper;

a paper type determination unit configured to determine whether a paper setting included in the received print setting is the paper type information usable to identify the one-sided printed paper based on the paper type information stored and managed by the paper type information management unit;

a print setting inhibition rule determination unit configured to determine whether print setting inhibition rule information associated with the paper type corresponding to the paper setting included in the received print setting is stored and managed by the print setting inhibition rule management unit, if the paper type determination unit determines that the paper setting included in the received print setting corresponds to the paper type usable to identify the one-sided printed paper; and a control unit configured to perform control to change a print setting designated as an inhibition rule in the print setting inhibition rule information included in the received print setting to an alternate setting of the print setting, if the print setting inhibition rule determination unit determines that the print setting inhibition rule information associated with the paper type information corresponding to the paper setting included in the received print setting is stored and managed by the print setting inhibition rule management unit, wherein the print setting inhibition rule information includes an alternate setting of the setting to be designated as the inhibition rule, and wherein the control unit is configured to control the user interface to change a print setting corresponding to the print setting inhibition rule information associated with the paper type information corresponding to the designated paper setting to the alternate setting of the print setting.

10. The printing apparatus according to claim 9, wherein the print setting to be designated as the inhibition rule when printing using the one-sided printed paper is performed includes a process of performing printing on both surfaces of paper.

11. The printing apparatus according to claim 9, further comprising:

a paper type information registration unit configured to register the paper type information with the paper type information management unit; and a print setting inhibition rule registration unit configured to register the print setting inhibition rule information with the print setting inhibition rule management unit.

12. A printing system including a printing apparatus and an information processing apparatus including a user interface that is operable to designate a print setting for a print job to be printed by the printing apparatus, the printing apparatus comprising:

a paper type information management unit configured to store and manage paper type information as information indicating paper stored in the printing apparatus, wherein the paper type information includes information usable to determine whether an acquired paper type is one-sided printed paper that has a printed surface on which printing is already performed and an unprinted surface to be used for printing, the information processing apparatus comprising:

a paper type information acquisition unit configured to acquire the paper type information from the printing apparatus;

a print setting inhibition rule management unit configured to store and manage a print setting to be designated as an inhibition rule when printing using the one-sided printed paper is performed, as print setting inhibition rule information, in association with the paper type information usable to identify the one-sided printed paper;

a paper type determination unit configured to determine whether a paper setting included in the print setting designated by the user interface is a setting corresponding to the paper type information usable to identify the one-sided printed paper based on the paper type information acquired by the paper type information acquisition unit;

a print setting inhibition rule determination unit configured to determine whether print setting inhibition rule information associated with the paper type information corresponding to the designated paper setting is stored and managed by the print setting inhibition rule management unit, if the paper type determination unit determines that the designated paper setting is the setting corresponding to the paper type information usable to identify the one-sided printed paper; and a control unit configured to perform control to prevent a print setting designated as an inhibition rule in print setting inhibition rule information from being designated by the user interface, if the print setting inhibition rule determination unit determines that the print setting inhibition rule information associated with the paper type information corresponding to the designated paper setting is stored and managed by the print setting inhibition rule management unit, wherein the print setting inhibition rule information includes an alternate setting of the setting to be designated as the inhibition rule, and wherein the control unit is configured to control the user interface to change a print setting corresponding to the print setting inhibition rule information associated with the paper type information corresponding to the designated paper setting to the alternate setting of the print setting.

13. A printing system including a printing apparatus, an information processing apparatus including a user interface that is operable to designate a print setting for a print job to be printed by the printing apparatus, and a management apparatus, the management apparatus comprising:
a paper type information management unit configured to store and manage paper type information as information indicating paper stored in the printing apparatus, wherein the paper type information includes information usable to determine whether an acquired paper type is one-sided printed paper that has a printed surface on which printing is already performed and an unprinted surface to be used for printing; and a print setting inhibition rule management unit configured to store and manage print setting inhibition rule information that associates a print setting to be designated as an inhibition rule when printing using the one-sided printed paper is performed with the paper type information usable to identify the one-sided printed paper, the information processing apparatus comprising:
a paper type information acquisition unit configured to acquire the paper type information from the management apparatus;

a print setting inhibition rule acquisition unit configured to acquire the print setting inhibition rule information from the management apparatus;

a paper type determination unit configured to determine whether a paper setting included in the print setting designated by the user interface is a setting corresponding to the paper type information usable to identify the one-sided printed paper based on the paper type information acquired by the paper type information acquisition unit;

a print setting inhibition rule determination unit configured to determine whether print setting inhibition rule information associated with the paper type information corresponding to the designated paper setting is included in the print setting inhibition rule information acquired by the print setting inhibition rule acquisition unit, if the paper type determination unit determines that the designated paper setting is the setting corresponding to the paper type information usable to identify the one-sided printed paper; and a control unit configured to perform control to prevent a print setting designated as an inhibition rule in the print setting inhibition rule information from being designated by the user interface, if the print setting inhibition rule determination unit determines that the print setting inhibition rule information associated with the paper type information corresponding to the designated paper setting is included in the print setting inhibition rule information acquired by the print setting inhibition rule acquisition unit, wherein the print setting inhibition rule information includes an alternate setting of the setting to be designated as the inhibition rule, and wherein the control unit is configured to control the user interface to change a print setting corresponding to the print setting inhibition rule information associated with the paper type information corresponding to the designated paper setting to the alternate setting of the print setting.

14. A method for controlling an information processing apparatus including a user interface that is operable to designate a print setting for a print job to be printed by a printing apparatus and a print setting inhibition rule management unit configured to store and manage a print setting to be designated as an inhibition rule when printing is performed using one-sided printed paper that has a printed surface on which printing is already performed and an unprinted surface to be used for printing, as print setting inhibition rule information, in association with paper type information usable to identify the one-sided printed paper, the method comprising:

acquiring paper type information from the printing apparatus, as information indicating paper stored in the printing apparatus, wherein the paper type information includes information usable to determine whether an acquired paper type is the one-sided printed paper;

determining whether a paper setting included in the print setting designated by the user interface is a setting corresponding to the paper type information usable to identify the one-sided printed paper based on the acquired paper type information;

determining whether print setting inhibition rule information associated with the paper type information corresponding to the designated paper setting is stored and managed by the print setting inhibition rule management unit, if it is determined that the designated paper setting is the setting corresponding to the paper type information usable to identify the one-sided printed paper; and performing control to prevent the print setting designated as an inhibition rule in the print setting inhibition rule information from being designated by the user interface, if it is determined that the print setting inhibition rule information associated with the paper type information corresponding to the designated paper setting is stored and managed by the print setting inhibition rule management unit, wherein the print setting inhibition rule information includes an alternate setting of the setting to be designated as the inhibition rule, and wherein the performing control step controls the user interface to change a print setting corresponding to the print setting inhibition rule information associated with the paper type information corresponding to the designated paper setting to the alternate setting of the print setting.

15. A non-transitory computer-readable storage medium storing computer-executable instructions for causing a computer to perform the method according to claim 14.

16. A method for controlling an information processing apparatus including a user interface that is operable to designate a print setting for a print job to be printed by a printing apparatus, the method comprising:

acquiring paper type information from an external management apparatus, as information indicating paper stored in the printing apparatus, wherein the paper type information includes information usable to determine whether an acquired paper type is one-sided printed paper that has a printed surface on which printing is already performed and an unprinted surface to be used for printing;

acquiring, from the management apparatus, print setting inhibition rule information that associates a print setting to be designated as an inhibition rule when printing using the one-sided printed paper is performed with the paper type information usable to identify the one-sided printed paper;

determining whether a paper setting included in the print setting designated by the user interface is a setting corresponding to the paper type information usable to identify the one-sided printed paper based on the acquired paper type information;

determining whether print setting inhibition rule information associated with the paper type information corresponding to the designated paper setting is included in the acquired print setting inhibition rule information, if it is determined that the designated paper setting is the setting corresponding to the paper type information usable to identify the one-sided printed paper; and performing control to prevent the print setting designated as an inhibition rule in the print setting inhibition rule information from being designated by the user interface, if it is determined that the print setting inhibition rule information associated with the paper type information corresponding to the designated paper setting is included in the acquired print setting inhibition rule information, wherein the print setting inhibition rule information includes an alternate setting of the setting to be designated as the inhibition rule, and wherein the performing control step controls the user interface to change a print setting corresponding to the print setting inhibition rule information associated with the paper type information corresponding to the designated paper setting to the alternate setting of the print setting.

17. A non-transitory computer-readable storage medium storing computer-executable instructions for causing a computer to perform the method according to claim 16.

18. A method for controlling a printing apparatus configured to perform printing based on a print setting received from an information processing apparatus, wherein the printing apparatus includes:

a paper type information management unit configured to store and manage paper type information as information indicating paper stored in the printing apparatus, wherein the paper type information includes information usable to determine whether an acquired paper type is one-sided printed paper that has a printed surface on which printing is already performed and an unprinted surface to be used for printing; and a print setting inhibition rule management unit configured to store and manage a print setting to be designated as an inhibition rule when printing using the one-sided printed paper is performed and an alternate setting of the print setting to be designated as the inhibition rule, as print setting inhibition rule information, in association with the paper type information usable to identify the one-sided printed paper, the method comprising:

determining whether a paper setting included in the received print setting is the paper type information usable to identify the one-sided printed paper based on the paper type information stored and managed by the paper type information management unit;

determining whether print setting inhibition rule information associated with the paper type corresponding to the paper setting included in the received print setting is stored and managed by the print setting inhibition rule management unit, if it is determined that the paper setting included in the received print setting corresponds to the paper type usable to identify the one-sided printed paper; and performing control to change a print setting designated as an inhibition rule in the print setting inhibition rule information included in the received print setting to an alternate setting of the print setting, if it is determined that the print setting inhibition rule information associated with the paper type information corresponding to the paper setting included in the received print setting is stored and managed by the print setting inhibition rule management unit, wherein the print setting inhibition rule information includes an alternate setting of the setting to be designated as the inhibition rule, and wherein the performing control step controls the user interface to change a print setting corresponding to the print setting inhibition rule information associated with the paper type information corresponding to the designated paper setting to the alternate setting of the print setting.

19. A non-transitory computer-readable storage medium storing computer-executable instructions for causing a computer to perform the method according to claim 18.

* * * * *